United States Patent
Sato et al.

(10) Patent No.: US 12,234,322 B2
(45) Date of Patent: Feb. 25, 2025

(54) POLYOXYALKYLENE POLYMER AND CURABLE COMPOSITION

(71) Applicant: KANEKA CORPORATION, Osaka (JP)

(72) Inventors: Akinori Sato, Hyogo (JP); Takahiro Saito, Hyogo (JP); Kohei Yamashita, Hyogo (JP)

(73) Assignee: KANEKA CORPORATION, Osaka (JP)

(*) Notice: Subject to any disclaimer, the term of this patent is extended or adjusted under 35 U.S.C. 154(b) by 730 days.

(21) Appl. No.: 17/332,287

(22) Filed: May 27, 2021

(65) Prior Publication Data

US 2021/0284797 A1 Sep. 16, 2021

Related U.S. Application Data

(63) Continuation of application No. PCT/JP2019/044431, filed on Nov. 12, 2019.

(30) Foreign Application Priority Data

Nov. 27, 2018 (JP) ................................ 2018-221027

(51) Int. Cl.
| | | |
|---|---|---|
| C08G 65/331 | (2006.01) | |
| C08F 220/18 | (2006.01) | |
| C08F 224/00 | (2006.01) | |
| C08G 65/12 | (2006.01) | |
| C08G 65/336 | (2006.01) | |
| C08K 5/5419 | (2006.01) | |
| C08K 5/5425 | (2006.01) | |
| C08K 5/56 | (2006.01) | |
| C08L 71/02 | (2006.01) | |
| C08L 101/02 | (2006.01) | |
| C08L 101/10 | (2006.01) | |

(52) U.S. Cl.
CPC ...... *C08G 65/331* (2013.01); *C08F 220/1804* (2020.02); *C08F 224/00* (2013.01); *C08G 65/12* (2013.01); *C08G 65/336* (2013.01); *C08K 5/5419* (2013.01); *C08K 5/5425* (2013.01); *C08K 5/56* (2013.01); *C08L 71/02* (2013.01); *C08L 101/02* (2013.01); *C08L 101/10* (2013.01); *C08G 2150/00* (2013.01); *C08G 2170/00* (2013.01); *C08G 2190/00* (2013.01); *C08G 2650/06* (2013.01); *C08G 2650/22* (2013.01)

(58) Field of Classification Search
CPC .... C08G 65/331; C08G 65/12; C08G 65/336; C08G 2150/00; C08G 2170/00; C08G 2190/00; C08G 2650/06; C08G 2650/22; C08F 224/00; C08F 220/1804; C08K 5/5419; C08K 5/5425; C08K 5/56; C08L 71/02; C08L 101/02; C08L 101/10
See application file for complete search history.

(56) References Cited

U.S. PATENT DOCUMENTS

2015/0133622 A1  5/2015  Harumashi et al.

FOREIGN PATENT DOCUMENTS

| EP | 3006504 A1 | 4/2016 |
| EP | 3006511 A1 | 4/2016 |
| EP | 3342819 A1 | 7/2018 |
| JP | S52-73998 A | 6/1977 |
| JP | 2019-156883 A | 9/2019 |
| JP | 2019-156884 A | 9/2019 |
| JP | 2019196477 A | 11/2019 |
| WO | 2013/180203 A1 | 12/2013 |
| WO | 2015080067 A1 | 6/2015 |
| WO | 2015105122 A1 | 7/2015 |

OTHER PUBLICATIONS

Extended European Search Report issued in corresponding European Patent Application No. EP 19888872.9 dated Jul. 26, 2022 (6 pages).
International Search Report issued in corresponding International Application No. PCT/JP2019/044431 mailed Jan. 21, 2020 (6 pages).
Written Opinion of the International Searching Authority issued in corresponding International Application No. PCT/JP2019/044431 mailed Jan. 21, 2020 (3 pages).

*Primary Examiner* — Rabon A Sergent
(74) *Attorney, Agent, or Firm* — Osha Bergman Watanabe & Burton LLP

(57) ABSTRACT

A polyoxyalkylene polymer including a main chain structure of a polyoxyalkylene and terminal structures bonded to ends of the main chain structure is provided. The terminal structures include a hydrolyzable silyl group and further include a terminal olefin group and/or an internal olefin group. The total number of the hydrolyzable silyl, terminal olefin, and internal olefin groups is more than 1.0 on average per terminal structure, and the ratio of the number of moles of the hydrolyzable silyl groups to the total number of moles of the hydrolyzable silyl, terminal olefin, and internal olefin groups is from 0.3 to 0.7.

16 Claims, No Drawings

POLYOXYALKYLENE POLYMER AND CURABLE COMPOSITION

TECHNICAL FIELD

The present invention relates to a hydrolyzable silyl group-containing polyoxyalkylene polymer and a curable composition containing the polymer.

BACKGROUND

Hydrolyzable silyl group-containing polymers are known as moisture-reactive polymers. These polymers are contained in many industrial products such as adhesives, sealing materials, coating materials, paints, and pressure-sensitive adhesives, and are used in diverse fields.

Main chain structures known as those of the above polymers include polyoxyalkylene polymers, saturated hydrocarbon polymers, and (meth)acrylic ester polymers. In particular, a hydrolyzable silyl group-containing polyoxyalkylene polymer has a relatively low viscosity at room temperature and is easy to handle. Further, a cured product resulting from a reaction of the polyoxyalkylene polymer exhibits good elasticity. By virtue of these and other features, the polyoxyalkylene polymer can be used in a wide range of applications.

Patent Literature 1 discloses a room temperature-curing composition containing a polyoxyalkylene polymer terminated at at least one end by a hydrolyzable silyl group. This literature describes a method of producing the polymer, the method consisting of: converting a terminal hydroxy group of a polyoxyalkylene polymer to an alkoxide group; then reacting the polymer with an organic halide such as allyl chloride to introduce a carbon-carbon double bond into the terminal group; and further subjecting the polymer to addition reaction with a hydrosilane to convert the terminal group to a hydrolyzable silyl group.

Patent Literature 2 discloses a polyoxyalkylene polymer having two or more hydrolyzable silyl groups in one terminal moiety. This literature describes a method of producing the polymer, the method consisting of: first converting a terminal hydroxy group of a polymer to an alkoxide group; then reacting the polymer with a carbon-carbon double bond-containing epoxy compound and further with a carbon-carbon double bond-containing organic halide such as allyl chloride to introduce two or more carbon-carbon double bonds into one terminal moiety; and subsequently subjecting the polymer to addition reaction with a hydrosilane.

In the recent building industry, there is an increasing demand for sealing materials less prone to bleed-out. To meet this demand, a technique for preparing a curable composition for sealing materials has been investigated in which a conventional phthalic ester-based or PPG-based plasticizer is not used but in which a reactive diluent having a hydrolyzable silyl group introduced into only one end of a polymer molecular chain is added instead of the conventional plasticizer.

PTL 1: Japanese Laid-Open Patent Application Publication No. S52-73998
PTL 2: WO No. 2013/180203

SUMMARY

The addition of such a reactive diluent to a curable composition containing a hydrolyzable silyl group-containing polyoxyalkylene polymer can reduce the occurrence of bleed-out, but tends to decrease the recovery performance of a cured product of the composition (the "recovery performance" refers to the ability to return to the original shape after application of a given deformation). A possible approach to this issue may be to improve the recovery performance by increasing the modulus of a cured product of the hydrolyzable silyl group-containing polyoxyalkylene polymer used as the base polymer (the "modulus" generally refers to a stress required to apply a given deformation and in this case refers particularly to a stress at elongation of a dumbbell-shaped specimen). However, the modulus is desirably kept low because an increase in modulus can lead to a decrease in flexibility.

In view of the above circumstances, one or more embodiments of the present invention aim to provide: a hydrolyzable silyl group-containing polyoxyalkylene polymer with which a cured product able to exhibit low modulus and at the same time high recovery performance can be made; and a curable composition containing the polymer.

The present inventors have conducted intensive studies and finally found that when a polyoxyalkylene polymer having terminal structures including hydrolyzable silyl groups and further including terminal olefin groups and/or internal olefin groups meets the following requirements, the polymer can be provided as a hydrolyzable silyl group-containing polyoxyalkylene polymer with which a cured product able to exhibit low modulus (namely, high flexibility) and at the same time high recovery performance can be made: the total number of the hydrolyzable silyl, terminal olefin, and internal olefin groups is more than 1.0 on average per terminal structure; and the ratio of the number of moles of the hydrolyzable silyl groups to the total number of moles of the hydrolyzable silyl, terminal olefin, and internal olefin groups is set relatively low, in particular in the range of 0.3 to 0.7.

Specifically, one or more embodiments of the present invention relate to a polyoxyalkylene polymer (A) including a main chain structure of a polyoxyalkylene and terminal structures bonded to ends of the main chain structure, wherein the terminal structures include a hydrolyzable silyl group and further include a terminal olefin group and/or an internal olefin group, the total number of the hydrolyzable silyl, terminal olefin, and internal olefin groups is more than 1.0 on average per terminal structure, and the ratio of the number of moles of the hydrolyzable silyl groups to the total number of moles of the hydrolyzable silyl, terminal olefin, and internal olefin groups is from 0.3 to 0.7.

Preferably, the terminal structure includes a moiety derived from an epoxy compound having the terminal olefin group. More preferably, the number of the moieties derived from the epoxy compound having the terminal olefin group is more than 1.0 on average per terminal structure.

Preferably, the hydrolyzable silyl group is represented by the following formula (1):

$$-(Si(R^1_{2-b})(Y'_b)O)_m SiR^2_{3-a}Y_a \quad (1)$$, wherein:

$R^1$ and $R^2$ are the same or different and each represent a substituted or unsubstituted monovalent hydrocarbon group having 1 to 20 carbon atoms or a triorganosiloxy group represented by $(R')_3SiO-$; R' represents a substituted or unsubstituted monovalent hydrocarbon group having 1 to 20 carbon atoms, the R' groups being the same or different; Y and Y' are the same or different and each represent a hydroxy group or a hydrolyzable group; a represents 0, 1, 2, or 3; b represents 0, 1, or 2, the letters b optionally representing different numbers when m is 2 or more; m represents an integer of 0 to 19; and a+m×b represents an integer of 1 or more.

Preferably, $R^1$, $R^2$, or R' represents a substituted or unsubstituted monovalent hydrocarbon group having 1 to 3 carbon atoms.

More preferably, the hydrolyzable silyl group is represented by the following formula (2):

$$-SiR^2{}_{3-a}Y_a \quad (2),$$ wherein:

$R^2$ represents a substituted or unsubstituted monovalent hydrocarbon group having 1 to 20 carbon atoms or a triorganosiloxy group represented by (R')$_3$SiO—, the $R^2$ groups being the same or different; R' represents a substituted or unsubstituted monovalent hydrocarbon group having 1 to 20 carbon atoms, the R' groups being the same or different; and Y represents a hydroxy group or a hydrolyzable group, the Y groups being the same or different; and a represents 1, 2, or 3.

Even more preferably, the hydrolyzable silyl group is a trimethoxysilyl, triethoxysilyl, tris(2-propenyloxy)silyl, triacetoxysilyl, methyldimethoxysilyl, methyldiethoxysilyl, dimethoxyethylsilyl, (chloromethyl)dimethoxysilyl, (chloromethyl)diethoxysilyl, (methoxymethyl)dimethoxysilyl, (methoxymethyl)diethoxysilyl, (N,N-diethylaminomethyl)dimethoxysilyl, or (N,N-diethylaminomethyl)diethoxysilyl group.

Still even more preferably, the hydrolyzable silyl group is represented by the following formula (3):

$$SiR^2Y_2 \quad (3),$$ wherein:

$R^2$ represents a substituted or unsubstituted monovalent hydrocarbon group having 1 to 20 carbon atoms or a triorganosiloxy group represented by (R')$_3$SiO—; R' represents a substituted or unsubstituted monovalent hydrocarbon group having 1 to 20 carbon atoms, the R' groups being the same or different; and Y represents a hydroxy group or a hydrolyzable group, the Y groups being the same or different.

Preferably, the number of the hydrolyzable silyl groups is 0.85 or more on average per terminal structure.

The total number of the hydrolyzable silyl, terminal olefin, and internal olefin groups is preferably 1.1 or more on average per terminal structure and more preferably 1.3 or more on average per terminal structure. Preferably, the total number of the hydrolyzable silyl, terminal olefin, and internal olefin groups is 10 or less on average per terminal structure.

Preferably, the terminal olefin group is represented by the following formula (4).

$$H_2C=C(R^3)-CH_2- \quad (4)$$

Preferably, the internal olefin group is represented by the following formula (5).

$$H_3C-C(R^3)=CH- \quad (5)$$

In the formulae (4) and (5), $R^3$ represents hydrogen, a substituted or unsubstituted alkyl group having 1 to 10 carbon atoms, a substituted or unsubstituted aryl group having 6 to 10 carbon atoms, or a substituted or unsubstituted aralkyl group having 7 to 10 carbon atoms. Preferably, $R^3$ represents hydrogen or a methyl group.

The ratio of the number of moles of the hydrolyzable silyl groups to the total number of moles of the hydrolyzable silyl, terminal olefin, and internal olefin groups is preferably 0.65 or less, more preferably 0.6 or less, even more preferably 0.55 or less, and particularly preferably 0.5 or less. The ratio is preferably 0.35 or more and more preferably 0.4 or more.

Preferably, a recovery rate of a cured product of the polyoxyalkylene polymer (A) is 90% or more. Preferably, a stress at 100% elongation of the cured product of the polyoxyalkylene polymer (A) is 0.40 MPa or less.

One or more embodiments of the present invention further relate to a curable composition containing the polyoxyalkylene polymer (A). The curable composition may further contain a reactive diluent (D) which is a polymer having 0.5 to less than 1.2 hydrolyzable silyl groups on average per molecule and having a lower viscosity at 23° C. than the polyoxyalkylene polymer (A). The curable composition may further contain a (meth)acrylic ester polymer (B) having a hydrolyzable silyl group.

One or more embodiments of the present invention further relate to a cured product of the curable composition. One or more embodiments of the present invention still further relate to the use of the polyoxyalkylene polymer (A) in a sealing material, an adhesive, a pressure-sensitive adhesive, an insulating material, a paint, a sealant, or a waterproofing material.

In one or more embodiments the present invention can provide: a hydrolyzable silyl group-containing polyoxyalkylene polymer with which a cured product able to exhibit low modulus and at the same time high recovery performance can be made; and a curable composition containing the polymer.

DETAILED DESCRIPTION

Hereinafter, one or more embodiments of the present invention will be described in detail.

Polyoxyalkylene Polymer (A)

In one or more embodiments the polyoxyalkylene polymer (A) of the present invention includes a main chain structure of a polyoxyalkylene and terminal structures bonded to the ends of the main chain structure.

The main chain structure refers to a polymer main chain composed of oxyalkylene repeating units. The main chain structure may be linear or branched. The main chain structure is preferably a polymer main chain consisting solely of the oxyalkylene repeating units or a polymer main chain including structures derived from an initiator used for polymerization in addition to the oxyalkylene repeating units and consisting solely of the oxyalkylene repeating units and the initiator-derived structures. The oxyalkylene repeating unit refers to a structural repeating unit of a polyether and is, for example, an oxyalkylene unit having 2 to 6, preferably 2 to 4, carbon atoms.

Examples of the main chain structure of the polyoxyalkylene include, but are not limited to, polyoxyethylene, polyoxypropylene, polyoxybutylene, polyoxytetramethylene, polyoxyethylene-polyoxypropylene copolymer, and polyoxypropylene-polyoxybutylene copolymer. Preferred is polyoxypropylene. One polymer may be used alone, or two or more polymers may be used in combination, as the main chain structure.

The terminal structures refer to moieties that do not contain the oxyalkylene repeating unit of the main chain structure and that are bonded to the ends of the main chain structure. When the main chain structure is linear, two terminal structures are present per polymer molecule. When the main chain structure is branched, three or more terminal structures are present per polymer molecule. When the main chain structure is a mixture of a linear structure and a branched structure, the number of the terminal structures can be between 2 and 3 on average per polymer molecule. The terminal structures are preferably bonded via oxygen atoms to the oxyalkylene units located at the ends of the main chain structure.

The terminal structures of the polyoxyalkylene polymer (A) according to one or more embodiments of the present invention include hydrolyzable silyl groups and further include either or both terminal olefin groups and internal olefin groups. This is not intended to apply to a terminal structure of a particular molecule of the polymer, but means that terminal structures in the whole polymer composed of a large number of polymer molecules include hydrolyzable silyl groups and further include terminal olefin groups and/or internal olefin groups. That is, a terminal structure of a particular molecule of the polymer may have only a hydrolyzable silyl group and have neither a terminal olefin group nor an internal olefin group, or may have either or both a terminal olefin group and an internal olefin group and have no hydrolyzable silyl group.

The hydrolyzable silyl groups refer to silyl groups that can undergo hydrolysis and dehydration condensation to form a siloxane bond between, and bind to, each other. Due to having the hydrolyzable silyl groups, the polyoxyalkylene polymer (A) according to one or more embodiments of the present invention exhibits curability based on dehydration condensation reaction. Specifically, the hydrolyzable silyl group can be represented by the following formula (1):

  (1), wherein:

$R^1$ and $R^2$ are the same or different and each represent a substituted or unsubstituted monovalent hydrocarbon group having 1 to 20 carbon atoms or a triorganosiloxy group represented by $(R')_3SiO-$; R' represents a substituted or unsubstituted monovalent hydrocarbon group having 1 to 20 carbon atoms, the R' groups being the same or different; Y and Y' are the same or different and each represent a hydroxy group or a hydrolyzable group; a represents 0, 1, 2, or 3; b represents 0, 1, or 2, the letters b optionally representing different numbers when m is 2 or more; m represents an integer of 0 to 19; and a+m×b represents an integer of 1 or more.

In the substituted or unsubstituted monovalent hydrocarbon group having 1 to 20 carbon atoms which is represented by $R^1$ or $R^2$, the number of carbon atoms is preferably from 1 to 10, more preferably from 1 to 8, even more preferably from 1 to 6, still even more preferably from 1 to 3, and particularly preferably 1 or 2. When the hydrocarbon group has a substituent, the substituent is not limited to a particular species, and examples of the substituent include halogen groups such as a chloro group, alkoxy groups such as a methoxy group, and amino groups such as a N,N-diethylamino group.

R' in the triorganosiloxy group represents a substituted or unsubstituted monovalent hydrocarbon group having 1 to 20 carbon atoms. The number of carbon atoms is preferably from 1 to 10, more preferably from 1 to 8, even more preferably from 1 to 6, still even more preferably from 1 to 3, and particularly preferably 1 or 2. When the hydrocarbon group has a substituent, the substituent is not limited to a particular species, and examples of the substituent include halogen groups such as a chloro group, alkoxy groups such as a methoxy group, and amino groups such as a N,N-diethylamino group. The three R' groups may be the same or different.

Examples of $R^1$ and $R^2$ include: unsubstituted alkyl groups such as methyl, ethyl, n-propyl, isopropyl, n-butyl, tert-butyl, n-hexyl, 2-ethylhexyl, and n-dodecyl groups; substituted alkyl groups such as chloromethyl, methoxymethyl, and N,N-diethylaminomethyl groups; unsaturated hydrocarbon groups such as vinyl, isopropenyl, and allyl groups; cycloalkyl groups such as a cyclohexyl group; aryl groups such as phenyl, toluyl, and 1-naphthyl groups; aralkyl groups such as a benzyl group; and triorganosiloxy groups represented by $(R')_3SiO-$ wherein R' is, for example, a methyl or phenyl group. Preferred are substituted or unsubstituted alkyl groups, more preferred are methyl, ethyl, chloromethyl, and methoxymethyl groups, even more preferred are methyl and ethyl groups, and particularly preferred is a methyl group. For each of $R^1$ and $R^2$, one group may be used alone, or two or more groups may be used in combination.

Examples of Y and Y' include a hydroxy group, hydrogen, a halogen, an alkoxy group, an acyloxy group, a ketoximate group, an amino group, an amide group, an acid amide group, an aminooxy group, a mercapto group, and an alkenyloxy group. Alkoxy and other groups as mentioned above may have a substituent. Alkoxy groups are preferred in terms of moderate hydrolyzability and ease of handling. More preferred are methoxy, ethoxy, n-propoxy, and isopropoxy groups, even more preferred are methoxy and ethoxy groups, and particularly preferred is a methoxy group. For each of Y and Y', one group may be used alone, or two or more groups may be used in combination.

The letter m represents an integer of 0 to 19 as previously stated, and preferably represents 0. When m is 0, the formula (1) can be rewritten as the following formula (2).

  (2)

In the formula (2), a represents 1, 2, or 3.

Examples of the hydrolyzable silyl group represented by the formula (2) include trimethoxysilyl, triethoxysilyl, tris(2-propenyloxy)silyl, triacetoxysilyl, methyldimethoxysilyl, methyldiethoxysilyl, dimethoxyethylsilyl, (chloromethyl)dimethoxysilyl, (chloromethyl)diethoxysilyl, (methoxymethyl)dimethoxysilyl, (methoxymethyl)diethoxysilyl, (N,N-diethylaminomethyl)dimethoxysilyl, and (N,N-diethylaminomethyl)diethoxysilyl groups. Among these, methyldimethoxysilyl, trimethoxysilyl, triethoxysilyl, (chloromethyl)dimethoxysilyl, (methoxymethyl)dimethoxysilyl, (methoxymethyl)diethoxysilyl, and (N,N-diethylaminomethyl)dimethoxysilyl groups are preferred because they have high reactivity and their use can lead to obtaining a cured product having good mechanical properties. In view of reactivity, trimethoxysilyl, (chloromethyl)dimethoxysilyl, and (methoxymethyl)dimethoxysilyl groups are more preferred. In view of stability, methyldimethoxysilyl, methyldiethoxysilyl, and triethoxysilyl groups are more preferred, and methyldiethoxysilyl and triethoxysilyl groups are even more preferred. Trimethoxysilyl, triethoxysilyl, and methyldimethoxysilyl groups are more preferred in view of ease of production. Among the above-mentioned groups, a methyldimethoxysilyl group is the most preferred.

In the formula (2), a preferably represents 2 in order to ensure the storage stability and reactivity of the polymer and at the same time ensure the flexibility of the cured product. When a is 2, the formula (2) can be rewritten as the following formula (3).

  (3)

In this formula, $R^2$ and Y are each as defined above. Two or more kinds of hydrolyzable silyl groups represented by the formula (1) or (2) and having different values of a may be used in combination.

The terminal olefin group refers to a carbon-carbon double bond containing a methylidene group ($H_2C=$). Specifically, the terminal olefin group can be represented by the following formula (4).

$$H_2C=C(R^3)-CH_2- \qquad (4)$$

In the formula (4), $R^3$ represents hydrogen, a substituted or unsubstituted alkyl group having 1 to 10 carbon atoms, a substituted or unsubstituted aryl group having 6 to 10 carbon atoms, or a substituted or unsubstituted aralkyl group having 7 to 10 carbon atoms. The number of carbon atoms of the alkyl group is preferably from 1 to 8, more preferably from 1 to 6, even more preferably from 1 to 3, and particularly preferably 1 or 2. The number of carbon atoms of the aryl group is preferably from 6 to 8 and more preferably 6 or 7. The number of carbon atoms of the aralkyl group is preferably 7 or 8. When the alkyl, aryl, or aralkyl group has a substituent, the substituent is not limited to a particular species, and examples of the substituent include halogen groups such as a chloro group, alkoxy groups such as a methoxy group, and amino groups such as a N,N-diethylamino group.

Examples of $R^3$ include hydrogen, alkyl groups such as methyl, ethyl, propyl, and butyl groups, aryl groups such as a phenyl group, and aralkyl groups such as a benzyl group. $R^3$ is preferably hydrogen or an alkyl group, more preferably hydrogen, a methyl group, or an ethyl group, and even more preferably hydrogen or a methyl group. The $R^3$ groups in the polymer may be the same or different.

The internal olefin group refers to a carbon-carbon double bond containing no methylidene group ($H_2C=$). Specifically, the internal olefin group can be represented by the following formula (5).

$$H_3C-C(R^3)=CH- \qquad (5)$$

In the formula (5), $R^3$ typically represents the same group as $R^3$ in the formula (4), but may represent a group different from $R^3$ in the formula (4) insofar as the group is within the definition of $R^3$. The $R^3$ groups in the polymer may be the same or different.

The internal olefin group is a group generated by an internal rearrangement reaction of the terminal olefin group. When the terminal olefin group is an allyl group ($R^3=H$), the internal olefin group generated by the internal rearrangement reaction of the terminal olefin group is a 1-propenyl group.

In one or more embodiments of the present invention, the polyoxyalkylene polymer (A), which has the terminal structures including the hydrolyzable silyl groups and further including the terminal olefin groups and/or internal olefin groups, the total number of the hydrolyzable silyl, terminal olefin, and internal olefin groups is more than 1.0 on average per terminal structure. As such, a cured product of the polyoxyalkylene polymer (A) according to one or more embodiments of the present invention can exhibit lower modulus than a cured product of another polyoxyalkylene polymer in which the total number is 1.0 or less on average per terminal structure when the amount of the hydrolyzable silyl groups introduced is the same between the polyoxyalkylene polymer (A) and the other polyoxyalkylene polymer. The total number is preferably 1.1 or more, more preferably 1.3 or more, and even more preferably 1.5 or more. Further, the total number is preferably more than 1.5, particularly preferably 2.0 or more, and most preferably 2.5 or more. The upper limit of the total number is not limited to a particular value. In view of the economic efficiency and the efficiency of introduction of the terminal structures, the total number is preferably 10 or less, more preferably 8 or less, even more preferably 6 or less, and particularly preferably 5 or less.

The total number of the hydrolyzable silyl, terminal olefin, and internal olefin groups per terminal structure can be paraphrased as the average ratio of the total number of the hydrolyzable silyl, terminal olefin, and internal olefin groups to the number of the ends of the main chain structure, and can be expressed as (the total number of the hydrolyzable silyl, terminal olefin, and internal olefin groups per polymer molecule)/(the number of the ends of the main chain structure in one polymer molecule).

In one or more embodiments of the present invention, the total number of the hydrolyzable silyl, terminal olefin, and internal olefin groups per terminal structure can be appropriately determined by those skilled in the art. For example, when, as described later, the polyoxyalkylene polymer (A) according to one or more embodiments of the present invention is produced by a method in which a hydroxy-terminated polyoxyalkylene polymer (E) is reacted with a terminal olefin group-containing epoxy compound and then with a terminal olefin group-containing organic halide, the total number can be calculated by adding 1 (the number of olefin groups introduced from the organic halide) to the equivalents of the epoxy compound to the hydroxy groups of the hydroxy-terminated polyoxyalkylene polymer (E) (the number of olefin groups introduced from the epoxy compound). Alternatively, the total number can be determined by $^1$H NMR of the polyoxyalkylene polymer (A) or its precursor intermediate or titrimetric analysis of the iodine value or hydroxyl value of the polyoxyalkylene polymer (A) or its precursor intermediate.

Further, in the polyoxyalkylene polymer (A), the proportion of the hydrolyzable silyl groups to the total of the hydrolyzable silyl, terminal olefin, and internal olefin groups is set relatively low. This renders it possible to make a cured product able to exhibit low modulus and at the same time high recovery performance. Specifically, in the polyoxyalkylene polymer (A), the ratio of the number of moles of the hydrolyzable silyl groups to the total number of moles of the hydrolyzable silyl, terminal olefin, and internal olefin groups is in the range of 0.3 to 0.7 on average. Controlling the ratio in the range of 0.3 to 0.7 can ensure that a cured product containing the polyoxyalkylene polymer (A) according to one or more embodiments of the present invention exhibits both low modulus and high recovery performance. In order to further reduce the modulus of the cured product containing the polyoxyalkylene polymer (A), the ratio is preferably 0.65 or less, more preferably 0.6 or less, even more preferably 0.55 or less, and still even more preferably 0.5 or less. In order to further improve the recovery performance of the cured product containing the polyoxyalkylene polymer (A), the ratio is preferably 0.35 or more and more preferably 0.4 or more. The "ratio of the number of moles of hydrolyzable silyl groups to the total number of moles of the hydrolyzable silyl, terminal olefin, and internal olefin groups" can be referred to as the "degree of hydrolyzable silyl group introduction". The ratio may be expressed in percentage. For example, the ratio of 0.3 is equivalent to the ratio of 30%.

In one or more embodiments of the present invention, the ratio can be determined by $^1$H NMR. For example, when the terminal olefin groups are allyl groups and the hydrolyzable silyl groups are introduced into the terminal structures, as described later, by a hydrosilylation reaction with a hydrosilane compound having the hydrolyzable silyl groups, the ratio can be calculated by using the integrals of the signals listed below.

Hydrolyzable silyl groups: CH$_2$ bonded to silyl group (signal at around 0.6 ppm, 2H)

Terminal olefin groups: CH$_2$ of methylidene group (signal at around 5.2 ppm, 2H)

Internal olefin groups: CH bonded to terminal CH$_3$ group (the sum of signals at around 4.3 ppm and around 4.8 ppm, 1H)

If other signals overlap the above signals, the integrals of the other signals are excluded from the calculation.

The polyoxyalkylene polymer (A) has the hydrolyzable silyl groups to the extent that the total number of the hydrolyzable silyl, terminal olefin, and internal olefin groups and the ratio of the number of moles of the hydrolyzable silyl groups to the total number of moles of the hydrolyzable silyl, terminal olefin, and internal olefin groups meet the requirements described above. The number of the hydrolyzable silyl groups is preferably 0.7 or more, more preferably 0.85 or more, even more preferably 1.0 or more, and particularly preferably 1.2 or more on average per terminal structure. When the number of the hydrolyzable silyl groups per terminal structure is in such a range, the polyoxyalkylene polymer (A) can exhibit suitable curability. The number of the hydrolyzable silyl groups per terminal structure can be calculated by multiplying the above-described "total number of the hydrolyzable silyl, terminal olefin, and internal olefin groups per terminal structure" by the above-described "proportion of the hydrolyzable silyl groups to the total of the hydrolyzable silyl, terminal olefin, and internal olefin groups".

The terminal structures of the polyoxyalkylene polymer (A) are not limited to any particular structures as long as they include the hydrolyzable silyl groups and further include the terminal olefin groups and/or internal olefin groups. An example of the terminal structure having the hydrolyzable silyl group and the terminal olefin group is a structure represented by the following formula (6).

[Chem 1]

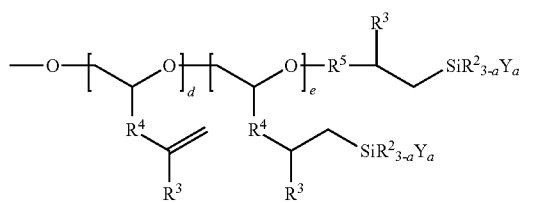

(6)

Another example is a structure represented by the following formula (7).

[Chem 2]

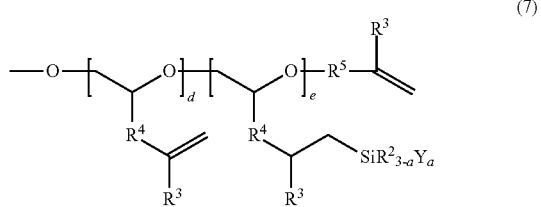

(7)

In the formulae (6) and (7), the leftmost oxygen atom is oxygen present in the oxyalkylene unit located at an end of the main chain structure of the polyoxyalkylene. While in the formulae (6) and (7) the hydrolyzable silyl group is a group represented by the formula (2), embodiments of the present invention are not limited to this structure.

In the formulae (6) and (7), d and e each represent an integer of 0 or more, and the sum of d and e is more than 0 on average per terminal structure. The sum of d and e is preferably 0.1 or more, more preferably 0.3 or more, and even more preferably 0.5 or more. The sum of d and e is still even more preferably more than 0.5, particularly preferably 1.0 or more, and most preferably 1.5 or more. The sum of d and e is preferably 9 or less, more preferably 7 or less, even more preferably 5 or less, and particularly preferably 4 or less.

R$^2$ and R$^3$ are each as defined above. The R$^2$ or R$^3$ groups in each formula may be the same or different.

In the formulae (6) and (7), R$^4$ represents a direct bond or a divalent organic group having 1 to 6 carbon atoms and optionally an oxygen atom. The number of carbon atoms of the organic group is preferably from 1 to 4, more preferably 1 or 2, and even more preferably 2. R$^4$ is preferably a divalent organic group having 1 to 6 carbon atoms and optionally an oxygen atom, more preferably —CH$_2$—, —CH$_2$O—, —CH$_2$OCH$_2$—, or —C(=O)—O—CH$_2$—, and even more preferably —CH$_2$OCH$_2$—. The R$^4$ groups may be the same or different.

In the formulae (6) and (7), R$^5$ represents a direct bond or a divalent organic group having 1 to 6 carbon atoms and optionally an oxygen atom. The number of carbon atoms of the organic group is preferably from 1 to 4, more preferably 1 or 2, and even more preferably 1. R$^5$ is preferably a direct bond or a divalent hydrocarbon group having 1 to 6 carbon atoms, more preferably a direct bond, —CH$_2$—, or —CH$_2$CH$_2$—, even more preferably a direct bond or —CH$_2$—, and particularly preferably —CH$_2$—.

The terminal structure represented by the formula (6) has (e+1) hydrolyzable silyl groups and d terminal olefin groups. The terminal structure represented by the formula (7) has e hydrolyzable silyl groups and (d+1) terminal olefin groups. The d terminal olefin group-containing units and the e hydrolyzable silyl group-containing units shown in the formula (6) or (7) correspond to moieties derived from a terminal olefin group-containing epoxy compound described later.

The terminal structure represented by the formula (6) or (7) is one terminal structure bonded to one end of the polymer main chain. Although a plurality of hydrolyzable silyl groups and/or terminal olefin groups are shown in the formulae (6) and (7), each of the formulae (6) and (7) does not represent two or more terminal structures but one terminal structure having a plurality of hydrolyzable silyl groups and/or terminal olefin groups. In the formula (6) or (7), the oxyalkylene repeating units constituting the polymer main chain are not shown. That is, the d or e bracketed structures present in the formula (6) or (7) do not correspond to the oxyalkylene repeating units constituting the polymer main chain.

These formulae are merely examples for illustrative purposes, and the terminal structures in embodiments of the present invention are not limited to the chemical structures of the formulae. The terminal olefin group present in the formula (6) or (7) may be an internal olefin group. In particular, at least one of the terminal olefin groups may be an internal olefin group. The order in which the d terminal olefin group-containing units and the e hydrolyzable silyl group-containing units are bonded is not limited to those shown in the formulae (6) and (7). The structural formula of the terminal structures included in the polyoxyalkylene polymer (A) is not limited to one specific formula. Typically, terminal structures represented by different structural formulae are present together. The terminal structure represented by the formula (6) and the terminal structure represented by the formula (7) may be present together.

The number-average molecular weight of the polyoxyalkylene polymer (A) is not limited to a particular range. The polystyrene-equivalent number-average molecular weight as determined by GPC is preferably from 3,000 to 100,000, more preferably from 3,000 to 50,000, and even more preferably from 3,000 to 30,000. If the number-average molecular weight is less than 3,000, the amount of the hydrolyzable silyl groups could be increased relative to the amount of the whole polymer, and such an increase could be disadvantageous in terms of production cost. If the number-average molecular weight is more than 100,000, the polymer could have high viscosity and therefore reduced workability.

The molecular weight distribution (Mw/Mn) of the polyoxyalkylene polymer (A) is not limited to a particular range. The molecular weight distribution is preferably narrow. Specifically, the molecular weight distribution is preferably less than 2.0, more preferably 1.6 or less, even more preferably 1.5 or less, and particularly preferably 1.4 or less. The molecular weight distribution (Mw/Mn) can be calculated from the number-average and weight-average molecular weights as determined by GPC analysis.

The stress at 100% elongation (100% modulus) of a cured product of the polyoxyalkylene polymer (A) is preferably 0.40 MPa or less and more preferably 0.35 MPa or less in view of ensuring desired flexibility of a cured product of a curable composition containing the polyoxyalkylene polymer (A). In order to ensure desired mechanical properties of the cured product of the composition, the stress at 100% elongation of the cured product of the polymer is preferably 0.10 MPa or more and more preferably 0.15 MPa or more. The stress at 100% elongation of the cured product of the polymer is defined as a parameter measured under the conditions described hereinafter.

Method of Measuring Stress at 100% Elongation of Cured Product of Polymer

A 3-mm-thick sheet-shaped mold is charged with a mixture of the polyoxyalkylene polymer, tin(II) octylate, laurylamine, and distilled water (polyoxyalkylene polymer/tin(II) octylate/laurylamine/distilled water weight ratio=40/1.2/0.2/0.24). The mixture in the mold is stored at a temperature of 23° C. and a relative humidity of 50% for 1 hour or more and subsequently aged in a dryer at 70° C. for 20 hours to obtain a sheet-shaped cured product. The cured product obtained is punched to prepare a No. 3 dumbbell-shaped specimen according to JIS K 6251. The specimen prepared is subjected to tensile testing (tensile speed=200 mm/min) performed using Autograph at a temperature of 23° C. and a relative humidity of 50%, and the stress at 100% elongation of the specimen is measured.

The recovery rate of the cured product of the polyoxyalkylene polymer (A) is preferably 90% or more in view of increasing the recovery performance of a cured product of a curable composition containing the polyoxyalkylene polymer (A). The recovery rate of the cured product of the polymer is defined as a parameter measured under the conditions described hereinafter.

Method of Measuring Recovery Rate of Cured Product of Polymer

A 3-mm-thick sheet-shaped mold is charged with a mixture of the polyoxyalkylene polymer, 3-(N-2-aminoethylamino)propyltrimethoxysilane, tin(II) octylate, laurylamine, and distilled water (polyoxyalkylene polymer/3-(N-2-aminoethylamino)propyltrimethoxysilane/tin(II) octylate/laurylamine/distilled water weight ratio=40/1.2/1.2/0.2/0.32). The mixture is then cured at a temperature of 23° C. and a relative humidity of 50% for 3 days and subsequently aged in a dryer at 50° C. for 4 days to obtain a sheet-shaped cured product. The sheet-shaped cured product is punched to prepare a No. 7 dumbbell-shaped specimen. Two lines are drawn in the waist of the dumbbell-shaped specimen, with a distance of 10 mm between the lines. The dumbbell-shaped specimen is elongated so that the distance between the lines reaches 15 mm, and the specimen fixed in this elongated state is allowed to stand in a dryer at 50° C. After 5 hours, the specimen is released from the elongated state and left at a temperature of 23° C. and a relative humidity of 50% for 1 hour, after which the distance between the lines is measured to determine the recovery rate.

Method of Producing Polyoxyalkylene Polymer (A)

Next, a method of producing the polyoxyalkylene polymer (A) according to one or more embodiments of the present invention will be described. The polyoxyalkylene polymer (A) can be produced as follows: terminal olefin groups are introduced into a hydroxy-terminated polyoxyalkylene polymer (E) by making use of the reactivity of the hydroxy groups, with the number of the terminal olefin groups being more than 1.0 on average per terminal structure; and then the polymer is reacted with a hydrolyzable silyl group-containing compound reactive with the terminal olefin groups to introduce hydrolyzable silyl groups into the polymer.

Hereinafter, a method of producing the polyoxyalkylene polymer (A) according to one or more embodiments of the present invention will be described in detail. It should be noted that the present invention is not limited to the method described below. First, the hydroxy-terminated polyoxyalkylene polymer (E) is reacted with a terminal olefin group-containing epoxy compound (8) and further with a terminal olefin group-containing organic halide (10) to introduce terminal olefin groups into the polymer, with the number of the introduced terminal olefin groups being more than 1.0 on average per terminal structure of the polymer. Next, the terminal olefin groups are subjected to a hydrosilylation reaction with a hydrolyzable silyl group-containing hydrosilane compound (12) to introduce hydrolyzable silyl groups into the terminal structures and thereby give the polyoxyalkylene polymer (A). The reactions of the polymer terminal structures in the above production method can be represented, for example, by the reaction formula shown below. In the formula, X represents a halogen and M represents an alkali metal.

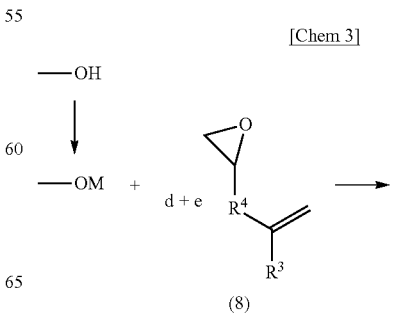

[Chem 3]

(8)

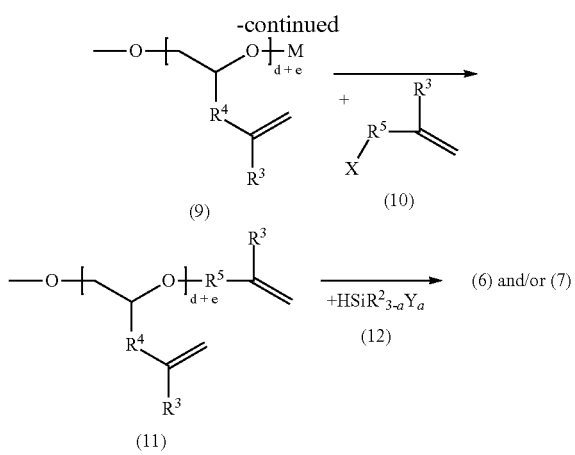

In one or more embodiments of the present invention, when the hydrolyzable silyl groups are introduced, not all the reactive terminal olefin groups are reacted with the hydrosilane compound, but instead the degree of reaction is controlled to allow some of the terminal olefin groups to remain unreacted. As a result, the polyoxyalkylene polymer (A) can be obtained in which the ratio of the number of moles of the hydrolyzable silyl groups to the total number of moles of the hydrolyzable silyl, terminal olefin, and internal olefin groups falls within the range of 0.3 to 0.7.

The internal olefin groups can be produced by an internal rearrangement reaction (isomerization) of the terminal olefin groups which occurs as a side reaction during the hydrosilylation reaction. The produced internal olefin groups have low hydrosilylation activity and thus remain in the polyoxyalkylene polymer (A) without reacting with the hydrosilane compound during the hydrosilylation reaction.

Hereinafter, one or more embodiments of the method of producing the polyoxyalkylene polymer (A) will be described in detail. It should be noted that the method of producing the polyoxyalkylene polymer (A) is not limited to the embodiments described below.

Polymerization

The main chain structure of the polyoxyalkylene polymer can be formed by polymerizing an epoxy compound with a hydroxy group-containing initiator using a conventionally known method. That is, the hydroxy-terminated polyoxyalkylene polymer (E) is obtained by this polymerization. The method for polymerization is not limited to a particular method. A polymerization method using a double metal cyanide complex catalyst such as zinc hexacyanocobaltate-glyme complex is preferred because this method can yield a hydroxy-terminated polymer having a narrow molecular weight distribution (Mw/Mn).

Examples of the hydroxy group-containing initiator include, but are not limited to, organic compounds having one or more hydroxy groups such as ethylene glycol, propylene glycol, glycerin, pentaerythritol, low-molecular-weight polyoxypropylene glycol, low-molecular-weight polyoxypropylene triol, allyl alcohol, low-molecular-weight polyoxypropylene monoallyl ether, and low-molecular-weight polyoxypropylene monoalkyl ether.

Examples of the epoxy compound include, but are not limited to, alkylene oxides such as ethylene oxide and propylene oxide and glycidyl ethers such as methyl glycidyl ether and butyl glycidyl ether. Preferred is propylene oxide.

Introduction of Terminal Olefin Groups

The method of introducing the terminal olefin groups into the polymer in such a way that the number of the terminal olefin groups will be more than 1.0 on average per terminal structure is preferably a method in which: an alkali metal salt is allowed to act on the hydroxy-terminated polyoxyalkylene polymer (E) to convert the terminal hydroxy groups to alkoxide groups; and subsequently the polymer is reacted first with the terminal olefin group-containing epoxy compound (8) and then with the terminal olefin group-containing organic halide (10). A double metal cyanide complex catalyst may be used instead of the alkali metal salt.

Examples of the alkali metal salt include, but are not limited to, sodium hydroxide, sodium alkoxides, potassium hydroxide, potassium alkoxides, lithium hydroxide, lithium alkoxides, cesium hydroxide, and cesium alkoxides. In view of ease of handling and solubility, sodium hydroxide, sodium methoxide, sodium ethoxide, potassium hydroxide, potassium methoxide, and potassium ethoxide are preferred, and sodium methoxide and potassium methoxide are more preferred. In view of availability, sodium methoxide is particularly preferred. The alkali metal salt may be dissolved in a solvent, and the resulting solution may be used in the reaction.

The amount of the alkali metal salt used is not limited to a particular range. The molar ratio of the alkali metal salt to the hydroxy groups of the hydroxy-terminated polyoxyalkylene polymer (E) is preferably 0.5 or more, more preferably 0.6 or more, even more preferably 0.7 or more, and still even more preferably 0.8 or more. The molar ratio is preferably 1.2 or less and more preferably 1.1 or less. If the amount of the alkali metal salt used is excessively small, the reaction could fail to proceed sufficiently. Conversely, if the amount of the alkali metal salt used is excessively large, the alkali metal salt could remain as an impurity and cause a side reaction to proceed.

The purpose of the use of the alkali metal salt is to convert the hydroxy groups of the hydroxy-terminated polyoxyalkylene polymer (E) to alkoxide groups. To allow this conversion reaction to proceed efficiently, water and any hydroxy group-containing material other than the polyoxyalkylene polymer are preferably removed beforehand from the reaction system. This removal can be accomplished using a conventionally known method, examples of which include evaporation by heating, devolatilization under reduced pressure, spray vaporization, thin-film evaporation, and azeotropic devolatilization.

The temperature at which the alkali metal salt is allowed to act on the polymer can be freely chosen by those skilled in the art. The temperature is preferably in the range of 50° C. to 150° C. and more preferably in the range of 110° C. to 145° C. The length of the time during which the alkali metal salt is allowed to act on the polymer is preferably in the range of 10 minutes to 5 hours and more preferably in the range of 30 minutes to 3 hours.

The polyoxyalkylene polymer is then subjected to a ring-opening addition reaction with the terminal olefin group-containing epoxy compound (8) to form terminal structures (9) including moieties derived from the terminal olefin group-containing epoxy compound.

The terminal olefin group-containing epoxy compound can be represented by, but is not limited to, the chemical formula (8) shown in the above reaction formula. Specific examples of the epoxy compound include allyl glycidyl ether, methallyl glycidyl ether, glycidyl acrylate, glycidyl methacrylate, butadiene monoxide, and 1,4-cyclopentadiene monoepoxide. Allyl glycidyl ether is particularly preferred.

The amount of the terminal olefin group-containing epoxy compound (8) used is not limited to a particular range, and can be chosen as appropriate in consideration of the total number of the hydrolyzable silyl, terminal olefin, and internal olefin groups to be included in the terminal structures of the intended polymer and in consideration of the reactivity of the epoxy compound used. To be specific, the molar ratio of the epoxy compound (8) used to the hydroxy groups of the hydroxy-terminated polyoxyalkylene polymer (E) is preferably 0.1 or more, more preferably 0.3 or more, and even more preferably 0.5 or more. The molar ratio is still even more preferably more than 0.5, particularly preferably 1.0 or more, and most preferably 1.5 or more. The molar ratio is preferably 9 or less, more preferably 7 or less, even more preferably 5 or less, and particularly preferably 4 or less.

The temperature of the ring-opening addition reaction with the terminal olefin group-containing epoxy compound (8) can be freely chosen by those skilled in the art. The reaction temperature is preferably in the range of 60° C. to 150° C. and more preferably in the range of 110° C. to 145° C. The reaction time is preferably in the range of 10 minutes to 5 hours and more preferably in the range of 1 to 4 hours.

The polyoxyalkylene polymer having the terminal structures (9) including the moieties derived from the terminal olefin group-epoxy compound is then reacted with the terminal olefin group-containing organic halide (10) to form ether bonds through halogen substitution and thus convert the terminal alkoxide groups of the polymer to the terminal olefin groups. This results in the formation of terminal structures (11) including the terminal olefin groups the number of which is more than 1.0 on average per terminal structure.

The terminal olefin group-containing organic halide can be represented by, but is not limited to, the chemical formula (10) shown in the above reaction formula. Specific examples of the organic halide include vinyl chloride, allyl chloride, methallyl chloride, vinyl bromide, allyl bromide, methallyl bromide, vinyl iodide, allyl iodide, and methallyl iodide. Allyl chloride and methallyl chloride are preferred in terms of ease of handling.

The amount of the terminal olefin group-containing organic halide (10) used is not limited to a particular range. The molar ratio of the terminal olefin group-containing organic halide (10) used to the hydroxy groups of the hydroxy-terminated polyoxyalkylene polymer (E) is preferably 0.7 or more and more preferably 1.0 or more. The molar ratio is preferably 5.0 or less and more preferably 2.0 or less.

The temperature of the reaction with the terminal olefin group-containing organic halide (10) can be freely chosen by those skilled in the art. The reaction temperature is preferably in the range of 50° C. to 150° C. and more preferably in the range of 110° C. to 140° C. The reaction time is preferably in the range of 10 minutes to 5 hours and more preferably in the range of 20 minutes to 2 hours.

Introduction of Hydrolyzable Silyl Groups

The polyoxyalkylene polymer obtained as above, which has the terminal structures (11) including the terminal olefin groups the number of which is more than 1.0 on average per terminal structure, is subjected to a hydrosilylation reaction with the hydrolyzable silyl group-containing hydrosilane compound (12) to introduce the hydrolyzable silyl groups into some of the terminal olefin groups. The rest of the terminal olefin groups is allowed to remain in the polymer without reacting with the hydrosilane compound (12). During the hydrosilylation reaction, as stated above, some of the terminal olefin groups can be isomerized into the internal olefin groups by a side reaction. The above processes can yield the polyoxyalkylene polymer (A) which has the terminal structures (6) and/or (7) including the hydrolyzable silyl groups and further including the terminal olefin groups and/or internal olefin groups. The hydrosilylation reaction is advantageous in that it can be easily performed, enables easy adjustment of the amount of the hydrolyzable silyl groups to be introduced, and allows the resulting polymer to have stable physical properties.

The hydrolyzable silyl group-containing hydrosilane compound can be represented by, but is not limited to, the chemical formula (12) shown in the above reaction formula. Specific examples of the hydrosilane compound include: halogenated silanes such as trichlorosilane, dichloromethylsilane, chlorodimethylsilane, dichlorophenylsilane, (chloromethyl)dichlorosilane, (dichloromethyl)dichlorosilane, bis(chloromethyl)chlorosilane, (methoxymethyl)dichlorosilane, (dimethoxymethyl)dichlorosilane, and bis(methoxymethyl)chlorosilane; alkoxy silanes such as trimethoxysilane, triethoxysilane, dimethoxymethylsilane, diethoxymethylsilane, dimethoxyphenylsilane, ethyldimethoxysilane, methoxydimethylsilane, ethoxydimethylsilane, (chloromethyl)methylmethoxysilane, (chloromethyl)dimethoxysilane, (chloromethyl)diethoxysilane, bis(chloromethyl) methoxysilane, (methoxymethyl)methylmethoxysilane, (methoxymethyl)dimethoxysilane, bis(methoxymethyl) methoxysilane, (methoxymethyl)diethoxysilane, (ethoxymethyl)diethoxysilane, (3,3,3-trifluoropropyl)dimethoxysilane, (N,N-diethylaminomethyl)dimethoxysilane, (N,N-diethylaminomethyl)diethoxysilane, [(chloromethyl) dimethoxysilyloxy]dimethylsilane, [(chloromethyl) diethoxysilyloxy]dimethylsilane, [(methoxymethyl) dimethoxysilyloxy]dimethylsilane, [(methoxymethyl) diethoxysilyloxy]dimethylsilane, [(diethylaminomethyl) dimethoxysilyloxy]dimethylsilane, and [(3,3,3-trifluoropropyl)dimethoxysilyloxy]dimethylsilane; acyloxy silanes such as diacetoxymethylsilane and diacetoxyphenylsilane; ketoximate silanes such as bis(dimethylketoximate) methylsilane and bis(cyclohexylketoximate)methylsilane; and isopropenyloxy silanes (deacetonated type) such as triisopropenyloxysilane, (chloromethyl)diisopropenyloxysilane, and (methoxymethyl)diisopropenyloxysilane.

The amount of the hydrolyzable silyl group-containing hydrosilane compound (12) used is such that the ratio of the number of moles of the hydrolyzable silyl groups to the total number of moles of the hydrolyzable silyl, terminal olefin, and internal olefin groups falls within the range of 0.3 to 0.7, and can be chosen as appropriate in consideration of the amount of the terminal olefin groups of the polyoxyalkylene polymer that has yet to undergo the hydrosilylation reaction. To be specific, the molar ratio of the hydrosilane compound to the terminal olefin groups of the polyoxyalkylene polymer that has yet to undergo the hydrosilylation reaction is preferably from 0.3 to 0.7.

The hydrosilylation reaction is preferably carried out in the presence of a hydrosilylation catalyst to promote the reaction. Known examples of the hydrosilylation catalyst include metals such as cobalt, nickel, iridium, platinum, palladium, rhodium, and ruthenium and complexes of these metals, and any of these can be used in the reaction. Specific examples of the catalyst include: platinum supported on a support such as alumina, silica, or carbon black; chloroplatinic acid; a chloroplatinic acid complex composed of chloroplatinic acid and another compound such as an alcohol, an aldehyde, or a ketone; platinum-olefin complexes such as $Pt(CH_2=CH_2)_2(PPh_3)$ and $Pt(CH_2=CH_2)_2Cl_2$; platinum-vinyl siloxane complexes such as $Pt\{(vinyl)Me_2SiOSiMe_2$ (vinyl)} and Pt{Me(vinyl)SiO}$_4$; platinum-phosphine complexes such as Pt(PPh$_3$)$_4$ and Pt(PBu$_3$)$_4$; and platinum-phosphite complexes such as Pt{P(OPh)$_3$}$_4$. Platinum catalysts such as chloroplatinic acid and platinum-vinyl siloxane complexes are preferred in view of reaction efficiency.

The hydrosilylation reaction is not limited to a particular temperature condition, and the temperature condition of the reaction can be freely chosen by those skilled in the art. In order to reduce the viscosity of the reaction system or increase the reactivity, the reaction is preferably conducted under heating. To be specific, the reaction is more preferably conducted at 50° C. to 150° C. and even more preferably conducted at 70° C. to 120° C. The reaction time can also be freely chosen. The reaction time is preferably adjusted along with the temperature condition to prevent the occurrence of an unintended condensation reaction of the polymer. To be specific, the reaction time is preferably in the range of 30 minutes to 5 hours and more preferably 3 hours or less.

The hydrosilylation reaction may be conducted in the presence of a trialkyl orthocarboxylate. In this case, viscosity increase during the hydrosilylation reaction can be reduced, and the storage stability of the resulting polymer can be improved.

Examples of the trialkyl orthocarboxylate include trimethyl orthoformate, triethyl orthoformate, trimethyl orthoacetate, and triethyl orthoacetate. Preferred are trimethyl orthoformate and trimethyl orthoacetate.

When a trialkyl orthocarboxylate is used, the amount of the trialkyl orthocarboxylate used is not limited to a particular range. The amount of the trialkyl orthocarboxylate is preferably from about 0.1 to 10 parts by weight and more preferably from about 0.1 to 3 parts by weight per 100 parts by weight of the polyoxyalkylene polymer (A).

Curable Composition

One or more embodiments of present invention can provide a curable composition containing the polyoxyalkylene polymer (A).

Silanol Condensation Catalyst

A silanol condensation catalyst is preferably contained in the curable composition according to one or more embodiments of the present invention in order to promote the hydrolysis and condensation reaction of the hydrolyzable silyl groups of the polyoxyalkylene polymer (A), i.e., the curing reaction of the polyoxyalkylene polymer (A).

The silanol condensation catalyst used can be a conventionally known catalyst. Specifically, for example, an organotin compound, a metal carboxylate, an amine compound, a carboxylic acid, an alkoxy metal, or an inorganic acid can be used as the silanol condensation catalyst.

Specific examples of the organotin compound include dibutyltin dilaurate, dibutyltin dioctanoate, dibutyltin bis(butyl maleate), dibutyltin diacetate, dibutyltin oxide, dibutyltin bis(acetylacetonate), a reaction product of dibutyltin oxide and a silicate compound, a reaction product of dibutyltin oxide and a phthalic ester, dioctyltin diacetate, dioctyltin dilaurate, dioctyltin bis(ethyl maleate), dioctyltin bis(octyl maleate), dioctyltin bis(acetylacetonate), and a reaction product of dioctyltin oxide and a silicate compound. Dioctyltin compounds are preferred in view of the recent increasing attention to environmental issues.

Specific examples of the metal carboxylate include tin carboxylate, bismuth carboxylate, titanium carboxylate, zirconium carboxylate, and iron carboxylate. The metal carboxylate may be a combination of any of the carboxylic acids mentioned below and any of various metals.

Specific examples of the amine compound include: amines such as octylamine, 2-ethylhexylamine, laurylamine, and stearylamine; nitrogen-containing heterocyclic compounds such as pyridine, 1,8-diazabicyclo[5,4,0]undecene-7 (DBU), 1,5-diazabicyclo[4,3,0]nonene-5 (DBN); guanidines such as guanidine, phenylguanidine, and diphenylguanidine; biguanides such as butylbiguanide, 1-o-tolylbiguanide, and 1-phenylbiguanide; and amino group-containing silane coupling agents; and ketimine compounds.

Specific examples of the carboxylic acid include acetic acid, propionic acid, butyric acid, 2-ethylhexanoic acid, lauric acid, stearic acid, oleic acid, linoleic acid, neodecanoic acid, and versatic acid.

Specific examples of the alkoxy metal include: titanium compounds such as tetrabutyl titanate, titanium tetrakis (acetylacetonate), and diisopropoxytitanium bis(ethyl acetoacetate); aluminum compounds such as aluminum tris (acetylacetonate) and diisopropoxyaluminum ethyl acetoacetate; and zirconium compounds such as zirconium tetrakis (acetylacetonate).

Examples of other silanol condensation catalysts which can be used include fluorine anion-containing compounds, photoacid generators, and photobase generators.

Two or more different silanol condensation catalysts may be used in combination. For example, a combined use of the amine compound and carboxylic acid as mentioned above can be expected to provide a reactivity-enhancing effect.

The content of the silanol condensation catalyst is preferably from 0.001 to 20 parts by weight, more preferably from 0.01 to 15 parts by weight, and particularly preferably from 0.01 to 10 parts by weight per 100 parts by weight of the polyoxyalkylene polymer (A). If the content of the silanol condensation catalyst is less than 0.001 parts by weight, the reaction rate could be insufficient. If the content of the silanol condensation catalyst is more than 20 parts by weight, the workability of the composition tends to deteriorate because too high a reaction rate shortens the time during which the composition remains usable, and the storage stability of the composition also tends to deteriorate. A silanol condensation catalyst could, after curing of the curable composition, seep to the surface of the cured product or smear the surface of the cured product. An approach to this situation is to limit the amount of the silanol condensation catalyst used to the range of 0.01 to 3.0 parts by weight. Doing so allows for maintenance of a good surface condition of the cured product without sacrifice of curability.

Preferably, the curable composition further contains a reactive diluent (D) which is a polymer having 0.5 to less than 1.2 hydrolyzable silyl groups on average per molecule and having a lower viscosity as measured at 23° C. than the polyoxyalkylene polymer (A). In one or more embodiments of the present invention, the addition of such a reactive diluent (D) renders it possible to lower the viscosity of the composition and reduce the occurrence of bleed-out while ensuring high recovery performance. Examples of the main chain structure of the reactive diluent (D) include polyoxyalkylene polymers, saturated hydrocarbon polymers, (meth) acrylic ester polymers, and polyorganosiloxane polymers. Among these, a polyoxyalkylene polymer is preferred as the main chain structure of the reactive diluent (D) in view of the compatibility with the polyoxyalkylene polymer (A).

The hydrolyzable silyl groups of the reactive diluent (D) may be present in molecular chain ends, side chains, or both. In particular, it is more preferable that the hydrolyzable silyl groups be present in the molecular chain ends, because in this case a cured rubber product having good mechanical properties is more likely to be obtained thanks to the increased molecular weight between crosslinks. The number of the hydrolyzable silyl groups is from 0.5 to less than 1.2 on average per molecule. In view of the mechanical properties of the cured product, the number of the hydrolyzable silyl groups is preferably 0.6 or more. To efficiently reduce the modulus of the cured product, the number of the hydrolyzable silyl groups is preferably less than 1.0. The reactive diluent (D) may have terminal olefin groups and/or internal olefin groups in addition to the hydrolyzable silyl groups or may have neither terminal olefin groups nor internal olefin groups. The total number of the hydrolyzable silyl, terminal olefin, and internal olefin groups may be 1.0 or less on average per terminal structure.

As for the molecular weight of the polymer used as the reactive diluent (D), the polystyrene-equivalent number-average molecular weight as determined by GPC is preferably from 3,000 to less than 15,000. If the number-average molecular weight is less than 3,000, this could lead to a failure to achieve sufficient mechanical properties. If the number-average molecular weight is 15,000 or more, this could lead to a high viscosity and therefore a failure to achieve a sufficient diluting effect.

The molecular weight distribution of the reactive diluent (D) is not limited to a particular range. The molecular weight distribution is preferably less than 2.0, more preferably 1.6 or less, and particularly preferably 1.4 or less.

The main chain structure of the reactive diluent (D) may be a linear or branched structure and may be a structure having two or more hydrolyzable silyl groups in one terminal moiety. More preferred is a linear polymer having a hydrolyzable silyl group introduced only in one terminal moiety. The main chain structure need not consist of one polymer. Different polymers may be produced separately and mixed or may be produced simultaneously to obtain a desired polymer.

The hydrolyzable silyl groups of the reactive diluent (D) can be freely selected. It is preferable for the reactive diluent (D) to have the same hydrolyzable silyl groups as the polyoxyalkylene polymer (A) because in this case the physical properties of the cured product are easy to adjust. In particular, the hydrolyzable silyl groups are preferably methyldimethoxysilyl groups.

The content of the reactive diluent (D) is preferably in the range of 1 to 200 parts by weight and more preferably in the range of 10 to 100 parts by weight per 100 parts by weight of the polyoxyalkylene polymer (A). If the content of the reactive diluent (D) is less than 1 part by weight, the viscosity decreasing effect on the composition tends to be small. If the content is more than 200 parts by weight, the mechanical properties of the cured product tend to deteriorate.

Preferably, the curable composition according to one or more embodiments of the present invention further contains a (meth)acrylic ester polymer (B) having a hydrolyzable silyl group. When the curable composition further contains the (meth)acrylic ester polymer (B), the weathering resistance of the cured product tends to be improved. The hydrolyzable silyl group of the (meth)acrylic ester polymer (B) may be present at an end, or in an inner portion, of the polymer main chain.

The (meth)acrylic ester monomer used to form the main chain of the (meth)acrylic ester polymer (B) is not limited to a particular monomer and may be any of various (meth) acrylic ester monomers. Specific examples of the (meth) acrylic ester monomer include methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth) acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, (3-trimethoxysilyl)propyl (meth)acrylate, (3-dimethoxymethylsilyl)propyl (meth) acrylate, (2-trimethoxysilyl)ethyl (meth)acrylate, (2-dimethoxymethylsilyl)ethyl (meth)acrylate, trimethoxysilylmethyl (meth)acrylate, (dimethoxymethylsilyl)methyl (meth) acrylate, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth) acrylate, and 2-perfluorohexadecylethyl (meth)acrylate.

Examples of monomers other than those mentioned above include: acrylic monomers such as acrylic acid and methacrylic acid; monomers having an amide group, such as N-methylolacrylamide and N-methylolmethacrylamide; monomers having an epoxy group, such as glycidyl acrylate and glycidyl methacrylate; and monomers having a nitrogen-containing group, such as diethylaminoethyl acrylate and diethylaminoethyl methacrylate.

The (meth)acrylic ester polymer (B) used can be a polymer resulting from copolymerization of a (meth)acrylic ester monomer and a vinyl monomer copolymerizable with the (meth)acrylic ester monomer. Examples of the vinyl monomer include, but are not limited to: styrene monomers such as styrene, vinyltoluene, α-methylstyrene, chlorostyrene, styrenesulfonic acid, and salts of styrenesulfonic acid; fluorine-containing vinyl monomers such as perfluoroethylene, perfluoropropylene, and vinylidene fluoride; silicon-containing vinyl monomers such as vinyltrimethoxysilane and vinyltriethoxysilane; maleic monomers such as maleic anhydride, maleic acid, and monoalkyl and dialkyl esters of maleic acid; fumaric monomers such as fumaric acid and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as acrylamide and methacrylamide; vinyl ester monomers such as vinyl acetate, vinyl propionate, vinyl pivalate, vinyl benzoate, and vinyl cinnamate; alkenyl monomers such as ethylene and propylene; conjugated diene monomers such as butadiene and isoprene; vinyl chloride; vinylidene chloride; allyl chloride; and allyl alcohol. Two or more of these may be used as copolymerization components.

The number of the hydrolyzable silyl groups of the (meth)acrylic ester polymer (B) is preferably from 0.5 to 5.0 on average per molecule. The number of the hydrolyzable silyl groups is more preferably 1.0 or more in view of the mechanical properties of the curable composition and more preferably 3.0 or less in view of the stability of the (meth) acrylic ester polymer (B).

The method for introducing the hydrolyzable silyl groups into the (meth)acrylic ester polymer is not limited to a particular method. The following describes examples of methods which can be used. One method is to (iv) copolymerize a compound having a polymerizable unsaturated group and a hydrolyzable silyl group with the monomer as described above. With this method, the hydrolyzable silyl groups tend to be randomly introduced into the main chain of the polymer. Another method is to (v) produce a (meth)acrylic ester polymer by polymerization using a mercaptosilane compound having a hydrolyzable silyl group as a chain transfer agent. With this method, the hydrolyzable silyl groups can be introduced into the ends of the polymer. Still another method is to (vi) copolymerize a compound having a polymerizable unsaturated group and a reactive functional group (V group) and then react the resulting copolymer with a compound having a hydrolyzable silyl group and a functional group reactive with the V group. Specific examples of the method (vi) include: a method in which 2-hydroxyethyl acrylate is copolymerized and then the hydroxy groups of the resulting copolymer are reacted with an isocyanatosilane having a hydrolyzable silyl group; a method in which glycidyl acrylate is copolymerized and then the epoxy groups of the resulting copolymer are reacted with an aminosilane compound having a hydrolyzable silyl group. Still another method is to (vii) modify terminal functional groups of a (meth)acrylic ester polymer synthesized by living radical polymerization and thereby introduce hydrolyzable silyl groups into the polymer. A (meth)acrylic ester polymer resulting from living radical polymerization allows easy introduction of functional groups into the polymer ends. The hydrolyzable silyl groups can be introduced into the polymer ends by modifying the easily introduced terminal functional groups.

The following describes examples of silicon compounds which can be used to introduce hydrolyzable silyl groups into a (meth)acrylic ester polymer by any one of the above methods. Examples of the compound used in the method (iv) and having a polymerizable unsaturated group and a hydrolyzable silyl group include 3-(trimethoxysilyl)propyl (meth)acrylate, 3-(dimethoxymethylsilyl)propyl (meth)acrylate, 3-(triethoxysilyl)propyl (meth)acrylate, (trimethoxysilyl)methyl (meth)acrylate, (dimethoxymethylsilyl)methyl (meth)acrylate, (triethoxysilyl)methyl (meth)acrylate, (diethoxymethylsilyl)methyl (meth)acrylate, and 3-((methoxymethyl)dimethoxysilyl)propyl (meth)acrylate. In view of availability, 3-trimethoxysilylpropyl (meth)acrylate and 3-(dimethoxymethylsilyl)propyl (meth)acrylate are particularly preferred.

Examples of the mercaptosilane compound used in the method (v) and having a hydrolyzable silyl group include 3-mercaptopropyltrimethoxysilane, 3-mercaptopropyldimethoxymethylsilane, 3-mercaptopropyltriethoxysilane, mercaptomethyltrimethoxysilane, (mercaptomethyl)dimethoxymethylsilane, and mercaptomethyltriethoxysilane.

Examples of the compound used in the method (vi) and having a hydrolyzable silyl group and a functional group reactive with the V group include: isocyanatosilane compounds such as 3-isocyanatopropyltrimethoxysilane, 3-isocyanatopropyldimethoxymethylsilane, 3-isocyanatopropyltriethoxysilane, isocyanatomethyltrimethoxysilane, isocyanatomethyltriethoxysilane, isocyanatomethyldimethoxymethylsilane, and isocyanatomethyldiethoxymethylsilane; epoxysilane compounds such as 3-glycidoxypropyltrimethoxysilane, 3-glycidoxypropyltriethoxysilane, 3-glycidoxypropyldimethoxymethylsilane, glycidoxymethyltrimethoxysilane, glycidoxymethyltriethoxysilane, glycidoxymethyldimethoxymethylsilane, and glycidoxymethyldiethoxymethylsilane; and aminosilane compounds such as 3-aminopropyltrimethoxysilane, 3-aminopropyltriethoxysilane, 3-aminopropyldimethoxymethylsilane, aminomethyltrimethoxysilane, aminomethyltriethoxysilane, aminomethyldimethoxymethylsilane, N-cyclohexylaminomethyltriethoxysilane, N-cyclohexylaminomethyldiethoxymethylsilane, N-phenylaminomethyltrimethoxysilane, N-(2-aminoethyl)aminomethyltrimethoxysilane, and N-(2-aminoethyl)-3-aminopropyltrimethoxysilane.

In the method (vii), any modification reaction can be used. Examples of the modification reaction method include: a method using a compound having a hydrolyzable silyl group and a functional group reactive with the terminal reactive group resulting from polymerization; and a method in which double bonds are introduced into the polymer ends using a compound having a double bond and a functional group reactive with the terminal reactive group and subsequently hydrolyzable silyl groups are introduced into the polymer ends through a process such as hydrosilylation.

The methods described above may be used in any combination. For example, a combined use of the methods (vi) and (v) can result in a (meth)acrylic ester polymer having hydrolyzable silyl groups both in the molecular chain ends and in the side chains.

The hydrolyzable silyl group of the (meth)acrylic ester polymer (B) can be represented by the following formula (8) just as can the hydrolyzable silyl group of the polyoxyalkylene polymer (A).

$$-(Si(R^1_{2-b})(Y'_b)O)_m SiR^2_{3-a} Y_a \qquad (8)$$

$R^1$, $R^2$, Y, Y', a, b, and m are the same as those defined in the formula (1). When m is 0, the formula (8) can be rewritten as the following formula (9).

$$-SiR^2_{3-a} Y_a \qquad (9)$$

In the formula (9), a represents 1, 2, or 3. Specific examples of hydrolyzable silyl groups preferred as that of the (meth)acrylic ester polymer (B) include methyldimethoxysilyl, methyldiethoxysilyl, trimethoxysilyl, and triethoxysilyl groups. A methyldimethoxysilyl group is more preferred in view of ensuring both the storage stability and curability of the curable composition containing the (meth)acrylic ester polymer (B). In view of enhancing the recovery performance of a cured product of the composition, a trimethoxysilyl group is more preferred.

It is common practice for those skilled in the art to choose the monomer composition of the (meth)acrylic ester polymer (B) depending on the application or purpose. For an application requiring flexibility such as the use in a sealing material, the polymer (B) is preferably a polymer having a relatively low glass transition temperature (Tg). The glass transition temperature Tg is preferably in the range of −100 to 100° C. and more preferably in the range of −60 to 0° C. The Tg can be determined by the Fox equation shown below.

$$1/(Tg(K)) = \Sigma(Mi/Tgi) \qquad \text{Fox equation:}$$

In this equation, Mi represents the weight fraction of a monomer component i of the polymer and Tgi represents the glass transition temperature (K) of a homopolymer of the monomer i.

The number-average molecular weight of the (meth)acrylic ester polymer (B) is not limited to a particular range. The polystyrene-equivalent molecular weight as determined by GPC analysis is preferably from 500 to 100,000, more preferably from 1,500 to 50,000, and particularly preferably from 5,000 to 30,000.

Methods for blending a polyoxyalkylene polymer and a (meth)acrylic ester polymer are proposed, for example, in Japanese Laid-Open Patent Application Publication No. S59-122541, Japanese Laid-Open Patent Application Publication No. S63-112642, Japanese Laid-Open Patent Application Publication No. H6-172631, and Japanese Laid-Open Patent Application Publication No. H11-116763. An alternative method is to polymerize a (meth)acrylic ester monomer in the presence of a polyoxypropylene polymer having a hydrolyzable silyl group. The details of such production methods are disclosed in various publications such as Japanese Laid-Open Patent Application Publication No. S59-78223, Japanese Laid-Open Patent Application Publication No. S60-228516, and Japanese Laid-Open Patent Application Publication No. S60-228517. The blending of the polyoxyalkylene polymer (A) and the (meth)acrylic ester polymer (B) can be accomplished by, but is not limited to, the same methods.

The mixing ratio between the polyoxyalkylene polymer (A) and the (meth)acrylic ester polymer (B) is not limited to a particular range. The polymer (A):polymer (B) weight ratio is preferably from 95:5 to 10:90, more preferably from 90:10 to 20:80, and particularly preferably from 80:20 to 40:60. For each of the polyoxyalkylene polymer (A) and the (meth)acrylic ester polymer (B), one polymer may be used alone, or two or more polymers may be used in combination.

Additional Components

Additional components may be added to the curable composition according to one or more embodiments of the present invention, and examples of the additional components include a silicon compound, a tackifier, a plasticizer, a solvent, a diluent, a silicate, a filler, an anti-sagging agent, an antioxidant, a light stabilizer, an ultraviolet absorber, a property modifier, a tackifying resin, an epoxy group-containing compound, a photocurable material, an oxygen-curable material, a surface modifier, an epoxy resin, another resin, a flame retardant, and a foaming agent. Further, various additives may be added, if desired, to the curable composition in order to adjust the physical properties of the curable composition or a cured product of the composition. Examples of the additives include a curability modifier, a radical inhibitor, a metal deactivator, an antiozonant, a phosphorus-based peroxide decomposer, a lubricant, a pigment, and a fungicide.

Filler

Various fillers can be added to the composition according to one or more embodiments of the present invention. Examples of the fillers include heavy calcium carbonate, colloidal calcium carbonate, magnesium carbonate, diatomite, clay, talc, titanium oxide, fumed silica, precipitated silica, crystalline silica, molten silica, silicic anhydride, hydrated silicic acid, carbon black, ferric oxide, aluminum fines, zinc oxide, activated zinc oxide, PVC powder, PMMA powder, and glass fibers or filaments. One filler may be used alone, or two or more fillers may be used as a mixture.

The amount of the filler used is preferably from 1 to 300 parts by weight and particularly preferably from 10 to 250 parts by weight per 100 parts by weight of the polyoxyalkylene polymer (A).

An organic or inorganic balloon may be added to reduce the weight (or reduce the specific gravity) of the composition. The balloon is a hollow spherical filler, and examples of the material of the balloon include: inorganic materials such as glass, Shirasu soil, and silica; and organic materials such as phenol resin, urea resin, polystyrene, and Saran. One balloon may be used alone, or two or more balloons may be used as a mixture.

The amount of the balloon used is preferably from 0.1 to 100 parts by weight and particularly preferably from 1 to 20 parts by weight per 100 parts by weight of the polyoxyalkylene polymer (A).

Tackifier

A tackifier can be added to the composition according to one or more embodiments of the present invention. A silane coupling agent or a reaction product of a silane coupling agent can be added as the tackifier.

Specific examples of the silane coupling agent include: amino group-containing silanes such as γ-aminopropyltrimethoxysilane, γ-aminopropylmethyldimethoxysilane, N-β-aminoethyl-γ-aminopropyltrimethoxysilane, N-β-aminoethyl-γ-aminopropylmethyldimethoxysilane, N-phenyl-γ-aminopropyltrimethoxysilane, and (2-aminoethyl)aminomethyltrimethoxysilane; isocyanate group-containing silanes such as γ-isocyanatopropyltrimethoxysilane, γ-isocyanatopropyltriethoxysilane, γ-isocyanatopropylmethyldimethoxysilane, α-isocyanatomethyltrimethoxysilane, and α-isocyanatomethyldimethoxymethylsilane; mercapto group-containing silanes such as γ-mercaptopropyltrimethoxysilane, γ-mercaptopropyltriethoxysilane, and γ-mercaptopropylmethyldimethoxysilane; and epoxy group-containing silanes such as γ-glycidoxypropyltrimethoxysilane and β-(3,4-epoxycyclohexyl)ethyltrimethoxysilane. Reaction products of the silane coupling agents can also be used. One tackifier may be used alone, or two or more tackifiers may be used as a mixture.

The amount of the tackifier used is preferably from 0.1 to 20 parts by weight and particularly preferably from 0.5 to 10 parts by weight per 100 parts by weight of the polyoxyalkylene polymer (A).

Plasticizer

A plasticizer can be added to the composition according to one or more embodiments of the present invention. Specific examples of the plasticizer include: phthalic ester compounds such as dibutyl phthalate, diisononyl phthalate (DINP), diheptyl phthalate, di(2-ethylhexyl) phthalate, diisodecyl phthalate (DIDP), and butyl benzyl phthalate; terephthalic ester compounds such as bis(2-ethylhexyl)-1,4-benzenedicarboxylate; non-phthalic ester compounds such as diisononyl 1,2-cyclohexanedicarboxylate; aliphatic polyfunctional carboxylic ester compounds such as dioctyl adipate, dioctyl sebacate, dibutyl sebacate, diisodecyl succinate, and tributyl acetylcitrate; unsaturated fatty acid ester compounds such as butyl oleate and methyl acetyl ricinoleate; alkylsulfonic acid phenyl esters; phosphoric ester compounds; trimellitic ester compounds; chlorinated paraffin; hydrocarbon oils such as alkyl diphenyl and partially-hydrogenated terphenyl; process oil; and epoxy plasticizers such as epoxidized soybean oil and benzyl epoxystearate.

A polymeric plasticizer can also be used. Specific examples of the polymeric plasticizer include: vinyl polymers; polyester plasticizers; polyethers such as polyether polyols (e.g., polyethylene glycol and polypropylene glycol having a number-average molecular weight of 500 or more) and derivatives derived from conversion of the hydroxy groups of the polyether polyols to ester or ether groups; polystyrenes; polybutadiene; polybutene; polyisobutylene; butadiene-acrylonitrile; and polychloroprene.

The amount of the plasticizer used is preferably from 5 to 150 parts by weight, more preferably from 10 to 120 parts by weight, and particularly preferably from 20 to 100 parts by weight per 100 parts by weight of the polyoxyalkylene polymer (A). If the amount of the plasticizer is less than 5 parts by weight, the plasticizer cannot exhibit its effect. If the amount of the plasticizer is more than 150 parts by weight, the mechanical strength of the cured product will be insufficient. One plasticizer may be used alone, or two or more plasticizers may be used in combination.

Solvent and Diluent

A solvent or diluent can be added to the composition according to one or more embodiments of the present invention. The solvent or diluent used is not limited to a particular material, and may be an aliphatic hydrocarbon, an aromatic hydrocarbon, an alicyclic hydrocarbon, a halogenated hydrocarbon, an alcohol, an ester, a ketone, or an ether. When a solvent or diluent is used, the boiling point of the solvent or diluent is preferably 150° C. or higher, more preferably 200° C. or higher, and particularly preferably 250° C. or higher to avoid indoor air pollution during indoor use of the composition. One solvent or diluent may be used alone, or two or more solvents or diluents may be used in combination.

Anti-Sagging Agent

An anti-sagging agent may be added, if desired, to the composition according to one or more embodiments of the present invention to prevent sagging and improve workability. Examples of the anti-sagging agent include, but are not limited to, polyamide waxes, hydrogenated castor oil derivatives, and metallic soaps such as calcium stearate, aluminum stearate, and barium stearate. One anti-sagging agent may be used alone, or two or more anti-sagging agents may be used in combination.

The amount of the anti-sagging agent used is preferably from 0.1 to 20 parts by weight per 100 parts by weight of the polyoxyalkylene polymer (A).

Antioxidant

An antioxidant (anti-aging agent) can be used in the composition according to one or more embodiments of the present invention. The use of an antioxidant can increase the weathering resistance of the cured product. Examples of the antioxidant include hindered phenol antioxidants, monophenol antioxidants, bisphenol antioxidants, and polyphenol antioxidants. Specific examples of the antioxidant are described in Japanese Laid-Open Patent Application Publication No. H4-283259 and Japanese Laid-Open Patent Application Publication No. H9-194731.

The amount of the antioxidant used is preferably from 0.1 to 10 parts by weight and particularly preferably from 0.2 to 5 parts by weight per 100 parts by weight of the polyoxyalkylene polymer (A).

Light Stabilizer

A light stabilizer can be used in the composition according to one or more embodiments of the present invention. The use of a light stabilizer can prevent photooxidative degradation of the cured product. Examples of the light stabilizer include benzotriazole, hindered amine, and benzoate compounds. Particularly preferred are hindered amine compounds.

The amount of the light stabilizer used is preferably from 0.1 to 10 parts by weight and particularly preferably from 0.2 to 5 parts by weight per 100 parts by weight of the polyoxyalkylene polymer (A).

Ultraviolet Absorber

An ultraviolet absorber can be used in the composition according to one or more embodiments of the present invention. The use of an ultraviolet absorber can increase the surface weathering resistance of the cured product. Examples of the ultraviolet absorber include benzophenone, benzotriazole, salicylate, substituted tolyl, and metal chelate compounds. Particularly preferred are benzotriazole compounds, examples of which include those sold under the names Tinuvin P, Tinuvin 213, Tinuvin 234, Tinuvin 326, Tinuvin 327, Tinuvin 328, Tinuvin 329, and Tinuvin 571 (all of these are manufactured by BASF).

The amount of the ultraviolet absorber used is preferably from 0.1 to 10 parts by weight and particularly preferably from 0.2 to 5 parts by weight per 100 parts by weight of the polyoxyalkylene polymer (A).

Property Modifier

A property modifier may be added, if desired, to the curable composition according to one or more embodiments of the present invention for the purpose of modifying the tensile properties of the resulting cured product. Examples of the property modifier include, but are not limited to: alkylalkoxysilanes such as phenoxytrimethylsilane, methyltrimethoxysilane, dimethyldimethoxysilane, trimethylmethoxysilane, and n-propyltrimethoxysilane; arylalkoxysilanes such as diphenyldimethoxysilane and phenyltrimethoxysilane; alkylisopropenoxysilanes such as dimethyldiisopropenoxysilane, methyltriisopropenoxysilane, and γ-glycidoxypropylmethyldiisopropenoxysilane; trialkylsilyl borates such as tris(trimethylsilyl) borate and tris(triethylsilyl) borate; silicone varnishes; and polysiloxanes. The use of the property modifier can increase the hardness of the cured product of the composition or conversely decrease the hardness and increase the elongation at break. One property modifier may be used alone, or two or more property modifiers may be used in combination.

In particular, a compound hydrolyzable to form a compound having a monovalent silanol group in the molecule has the advantage of decreasing the modulus of the cured product without aggravating the stickiness of the surface of the cured product. Particularly preferred is a compound the hydrolysis of which gives trimethylsilanol. Examples of the compound hydrolyzable to form a compound having a monovalent silanol group in the molecule include silicon compounds which are derivatives of alcohols such as hexanol, octanol, phenol, trimethylolpropane, glycerin, pentaerythritol, and sorbitol and the hydrolysis of which gives monosilanols.

The amount of the property modifier used is preferably from 0.1 to 10 parts by weight and particularly preferably from 0.5 to 5 parts by weight per 100 parts by weight of the polyoxyalkylene polymer (A).

Tackifying Resin

A tackifying resin can be added, if desired, to the composition according to one or more embodiments of the present invention for the purpose of increasing the bond strength or adhesion to a substrate or any other purpose. The tackifying resin used is not limited to a particular resin, and may be a commonly used tackifying resin.

Specific examples of the tackifying resin include terpene resins, aromatic modified terpene resins, hydrogenated terpene resins, terpene-phenol resins, phenol resins, modified phenol resins, xylene-phenol resins, cyclopentadiene-phenol resins, coumarone-indene resins, rosin resins, rosin ester resins, hydrogenated rosin ester resins, xylene resins, low-molecular-weight polystyrene resins, styrene copolymer resins, styrene block copolymers, hydrogenated styrene block copolymers, petroleum resins (such as C5 hydrocarbon resins, C9 hydrocarbon resins, and C5-C9 hydrocarbon copolymer resins), hydrogenated petroleum resins, and DCPD resins. One of these may be used alone, or two or more thereof may be used in combination.

The amount of the tackifying resin used is preferably from 2 to 100 parts by weight, more preferably from 5 to 50 parts by weight, and even more preferably from 5 to 30 parts by weight per 100 parts by weight of the polyoxyalkylene polymer (A). If the amount of the tackifying resin is less than 2 parts by weight, the tackifying resin is less likely to provide the enhancing effect on the bond strength or adhesion to a substrate. If the amount of the tackifying resin is more than 100 parts by weight, the composition could have too high a viscosity and be difficult to handle.

Epoxy Group-Containing Compound

An epoxy group-containing compound can be used in the composition according to one or more embodiments of the present invention. The use of an epoxy group-containing compound can increase the recovery performance of the cured product. Examples of the epoxy group-containing compound include epoxidized unsaturated fats and oils, epoxidized unsaturated fatty acid esters, alicyclic epoxy compounds, epichlorohydrin derivatives, and mixtures of the derivatives. Specific examples include epoxidized soybean oil, epoxidized linseed oil, bis(2-ethylhexyl)-4,5-epoxycyclohexane-1,2-dicarboxylate (E-PS), epoxy octyl stearate, and epoxy butyl stearate. It is recommended that the epoxy compound be used in an amount of 0.5 to 50 parts by weight per 100 parts by weight of the polyoxyalkylene polymer (A).

Photocurable Material

A photocurable material can be used in the composition according to one or more embodiments of the present invention. The use of a photocurable material can lead to the formation of a coating of the photocurable material on the surface of the cured product, resulting in reduction in stickiness of the cured product or increase in weathering resistance of the cured product. A wide variety of such compounds are known, including organic monomers, oligomers, resins, and compositions containing these. Typical examples of photocurable materials which can be used include: an unsaturated acrylic compound which is a monomer or an oligomer having one or more unsaturated acrylic or methacrylic groups or a mixture of the monomer and oligomer; polyvinyl cinnamates; and azide resins.

The photocurable material is preferably used in an amount of 0.1 to 20 parts by weight, more preferably 0.5 to 10 parts by weight, per 100 parts by weight of the polyoxyalkylene polymer (A). If the amount of the photocurable material is 0.1 parts by weight or less, the material fails to exhibit the weathering resistance-enhancing effect. If the amount of the photocurable material is 20 parts by weight or more, the cured product will be so hard as to be prone to cracking.

Oxygen-Curable Material

An oxygen-curable material can be used in the composition according to one or more embodiments of the present invention. Examples of the oxygen-curable material include unsaturated compounds reactive with oxygen in the air. The oxygen-curable material reacts with oxygen in the air to form a cured coating in the vicinity of the surface of the cured product, thus offering advantages such as preventing the surface of the cured product from becoming sticky and preventing deposition of dirt and dust on the surface of the cured product. Specific examples of the oxygen-curable material include: drying oils exemplified by tung oil and linseed oil; various alkyd resins resulting from modification of the drying oil compounds; drying oil-modified acrylic polymers, epoxy resins, and silicone resins; and liquid polymers such as 1,2-polybutadiene, 1,4-polybutadiene, and C5 to C8 diene polymers which are obtained by polymerization or copolymerization of diene compounds such as butadiene, chloroprene, isoprene, and 1,3-pentadiene. One of these materials may be used alone, or two or more thereof may be used in combination.

The oxygen-curable material is preferably used in an amount of 0.1 to 20 parts by weight, more preferably 0.5 to 10 parts by weight, per 100 parts by weight of the polyoxyalkylene polymer (A). If the amount of the oxygen-curable material used is less than 0.1 parts by weight, the improvement in soiling resistance will be insufficient. If the amount of the oxygen-curable material used is more than 20 parts by weight, the characteristics such as the tensile properties of the cured product tend to deteriorate. It is recommended that the oxygen-curable material be used together with a photocurable material as taught in Japanese Laid-Open Patent Application Publication No. H3-160053.

Epoxy Resin

An epoxy resin can also be used in the composition according to one or more embodiments of the present invention. The composition containing an added epoxy resin is suitable especially for use as an adhesive, in particular an adhesive for exterior wall tiles. Examples of the epoxy resin include bisphenol A epoxy resins and novolac epoxy resins.

As for the proportions of the epoxy resin used and the polyoxyalkylene polymer (A), the polyoxyalkylene polymer (A)/epoxy resin weight ratio is preferably in the range of 100/1 to 1/100. If the polyoxyalkylene polymer (A)/epoxy resin weight ratio is less than 1/100, the improving effect on the impact resistance and toughness of the epoxy resin cured product will be lessened. If the polyoxyalkylene polymer (A)/epoxy resin weight ratio is more than 100/1, the strength of the polymer cured product will be insufficient.

When the epoxy resin is added to the composition, a curing agent for curing the epoxy resin can also be used in the composition. The epoxy resin curing agent used is not limited to a particular material, and may be a commonly used epoxy resin curing agent.

When a curing agent for curing the epoxy resin is used, the amount of the curing agent used is preferably in the range of 0.1 to 300 parts by weight per 100 parts by weight of the epoxy resin.

Preparation of Curable Composition

The curable composition according to one or more embodiments of the present invention can be prepared as a one-part composition all the components of which are mixed together and hermetically stored and which, when applied to any object, cures under the action of moisture in the air. The curable composition can be prepared also as a two-part composition consisting of an organic polymer composition and a curing agent which is prepared separately from the organic polymer composition by mixing components such as a silanol condensation catalyst, a filler, a plasticizer, and water. In the case of this two-part composition, the organic polymer composition and the curing agent are mixed before use. In view of workability, the curable composition is preferably prepared as a one-part composition.

When the curable composition is a one-part composition, all the components are mixed together beforehand. Thus, it is preferable that a water-containing component be dried to remove water before use or dehydrated by a manipulation such as pressure reduction during mixing or kneading. The storage stability of the composition can be further improved by not only performing the drying/dehydration process but also adding an alkoxysilane compound such as n-propyltrimethoxysilane, vinyltrimethoxysilane, vinylmethyldimethoxysilane, γ-mercaptopropylmethyldimethoxysilane, γ-mercaptopropylmethyldiethoxysilane, or γ-glycidoxypropyltrimethoxysilane.

When a dehydration agent, in particular a water-reactive silicon compound such as vinyltrimethoxysilane, is used, the amount of the compound used as the dehydration agent is preferably in the range of 0.1 to 20 parts by weight and more preferably in the range of 0.5 to 10 parts by weight per 100 parts by weight of the polyoxyalkylene polymer (A).

Applications

The curable composition according to one or more embodiments of the present invention can be used as a pressure-sensitive adhesive, a sealing material for use in buildings, ships, automobiles, and roads, an adhesive, a waterproofing material, a coating-waterproofing material, a mold making material, a vibration-isolating material, a vibration-damping material, a soundproofing material, a foam material, a paint, or a spray material. Since a cured product resulting from curing of the curable composition has excellent flexibility and bond strength, the curable composition is suitable for use as a sealing material or an adhesive.

The curable composition can be used in diverse applications, including: a material for use in an electrical or electronic part, such as a sealant for the back surface of a solar cell; an electrical insulating material of an electrical or electronic part or device, such as an insulating sheath material for an electric wire or cable; an acoustic insulating material; an elastic adhesive; a binder; a contact adhesive; a spray-type sealing material; a crack-repairing material; an adhesive for tile laying; an adhesive for an asphalt-waterproofing material; a powder paint; a cast molding material; a rubber material for medical purposes; a pressure-sensitive adhesive for medical purposes; a pressure-sensitive adhesive sheet for medical purposes; a medical device sealing material; a dental impression material; a food packaging material; a joint sealing material for exterior cladding such as siding board; a coating material; an anti-skid covering material; a buffer material; a primer; an electrically conductive material for electromagnetic wave shielding; a thermally conductive material; a hot-melt material; a potting agent for electrical or electronic purposes; a film; a gasket; a concrete-reinforcing material; an adhesive for temporary bonding; any kind of molding material; a rust-proofing or waterproofing sealant for an edge face (cut edge) of wire glass or laminated glass; and a liquid sealing material for use in industrial parts such as parts of automobiles, large vehicles (e.g., cargo trucks and buses), railroad cars, aircrafts, ships, electric machines, and various other mechanical machines. For example, in an automobile, the curable composition according to one or more embodiments of the present invention can be used for diverse purposes, such as for adhesive mounting of various parts such as a plastic cover, a trim, a flange, a bumper, a window, and interior and exterior parts. Further, the curable composition can, alone or with the help of a primer, adhere to a wide variety of substrates such as glass, porcelain, wood, metal, and a resin molded article, and thus can be used as any of various types of sealing compositions and adhesive compositions. Additionally, the curable composition can be used as an adhesive for interior panels, an adhesive for exterior panels, an adhesive for tile laying, an adhesive for stone laying, an adhesive for ceiling finishing, an adhesive for floor finishing, an adhesive for wall finishing, an adhesive for vehicle panels, an adhesive for assembly of electrical, electronic, or precision equipment, an adhesive for bonding of leather, fiber products, fabric, paper, plates, or rubber, a reactive, post-curable pressure-sensitive adhesive, a sealing material for direct glazing, a sealing material for double-glazed glass, a sealing material for SSG, a sealing material for working joints of buildings, or a material for civil engineering or bridge construction. The curable composition can be used also as a pressure-sensitive adhesive such as a pressure-sensitive adhesive tape or sheet.

EXAMPLES

Hereinafter, one or more embodiments of the present invention will be described in more detail based on examples. It should be noted that embodiments of the present invention are not limited to the examples given below.

Example 1

Propylene oxide was polymerized using polyoxypropylene diol having a number-average molecular weight of about 3,000 as an initiator in the presence of a zinc hexacyanocobaltate-glyme complex catalyst. As a result, hydroxy-terminated polyoxypropylene (E-1) having a number-average molecular weight of 19,000 was obtained. Subsequently, 1.0 equivalent of sodium methoxide dissolved in methanol was added per equivalent of the hydroxy groups of the hydroxy-terminated polyoxypropylene, and methanol was distilled off at 140° C. This was followed by addition of 0.3 equivalents of allyl glycidyl ether, and the reaction was allowed to proceed at 140° C. for 2 hours to introduce unsaturated bonds. Further, 1.5 equivalents of 3-chloro-1-propene was added to convert the terminal hydroxy groups to allyl groups. To 100 parts by weight of the resulting allyl-terminated polyoxypropylene were added 36 ppm of a platinum-divinyldisiloxane complex (isopropyl alcohol solution with a concentration of 3 mass % calculated as the platinum content) and 1.47 parts by weight of methyldimethoxysilane, and the reaction was allowed to proceed at 90° C. for 2 hours to give terminal methyldimethoxysilyl group-containing linear polyoxypropylene (A-1) in which the total number of the hydrolyzable silyl, terminal olefin, and internal olefin groups per terminal structure (hereinafter, this total number will be referred to as "the total number of groups per terminal structure") was 1.3, in which the ratio of the number of moles of the hydrolyzable silyl groups to the total number of moles of the hydrolyzable silyl, terminal olefin, and internal olefin groups (hereinafter, this ratio will be referred to as "the degree of hydrolyzable silyl group introduction") was 68%, in which the number of the hydrolyzable silyl groups per terminal structure was 0.88, and whose number-average molecular weight was 19,000.

Example 2

Terminal methyldimethoxysilyl group-containing linear polyoxypropylene (A-2) was obtained through procedures identical to those used in Example 1, except that the amount of allyl glycidyl ether used was 2.0 equivalents and the amount of methyldimethoxysilane used was 1.89 parts by weight. For the polyoxypropylene (A-2), the total number of groups per terminal structure was 3.0, the degree of hydrolyzable silyl group introduction was 46%, the number of the hydrolyzable silyl groups per terminal structure was 1.38, and the number-average molecular weight was 19,000.

Example 3

Terminal methyldimethoxysilyl group-containing linear polyoxypropylene (A-3) was obtained through procedures identical to those used in Example 1, except that the amount of allyl glycidyl ether used was 3.0 equivalents and the amount of methyldimethoxysilane used was 2.23 parts by weight. For the polyoxypropylene (A-3), the total number of groups per terminal structure was 4.0, the degree of hydrolyzable silyl group introduction was 42%, the number of the hydrolyzable silyl groups per terminal structure was 1.68, and the number-average molecular weight was 19,000.

Comparative Example 1

Terminal methyldimethoxysilyl group-containing linear polyoxypropylene (C-1) was obtained through procedures identical to those used in Example 1, except that allyl glycidyl ether was not used and the amount of methyldimethoxysilane used was 1.31 parts by weight. For the polyoxypropylene (C-1), the total number of groups per terminal structure was 1.0, the degree of hydrolyzable silyl group introduction was 74%, the number of the hydrolyzable silyl groups per terminal structure was 0.74, and the number-average molecular weight was 19,000.

Example 4

Propylene oxide was polymerized using polyoxypropylene diol having a number-average molecular weight of about 3,000 as an initiator in the presence of a zinc hexacyanocobaltate-glyme complex catalyst. As a result, hydroxy-terminated polyoxypropylene (E-2) having a number-average molecular weight of 16,000 was obtained. Subsequently, 1.0 equivalent of sodium methoxide dissolved in methanol was added per equivalent of the hydroxy groups of the hydroxy-terminated polyoxypropylene, and methanol was distilled off at 140° C. This was followed by addition of 2.0 equivalents of allyl glycidyl ether, and the reaction was allowed to proceed at 140° C. for 2 hours to introduce unsaturated bonds. Further, 1.5 equivalents of 3-chloro-1-propene was added to convert the terminal hydroxy groups to allyl groups. To 100 parts by weight of the resulting allyl-terminated polyoxypropylene were added 36 ppm of a platinum-divinyldisiloxane complex (isopropyl alcohol solution with a concentration of 3 mass % calculated as the platinum content) and 2.02 parts by weight of methyldimethoxysilane, and the reaction was allowed to proceed at 90° C. for 2 hours to give terminal methyldimethoxysilyl group-containing linear polyoxypropylene (A-4) in which the total number of groups per terminal structure was 3.0, the degree of hydrolyzable silyl group introduction was 42%, and the number of the hydrolyzable silyl groups per terminal structure was 1.26 and whose number-average molecular weight was 16,000.

Example 5

Terminal methyldimethoxysilyl group-containing linear polyoxypropylene (A-5) was obtained through procedures identical to those used in Example 4, except that the amount of methyldimethoxysilane used was 2.29 parts by weight. For the polyoxypropylene (A-5), the total number of groups per terminal structure was 3.0, the degree of hydrolyzable silyl group introduction was 48%, the number of the hydrolyzable silyl groups per terminal structure was 1.44, and the number-average molecular weight was 16,000.

Comparative Example 2

Terminal methyldimethoxysilyl group-containing linear polyoxypropylene (C-2) was obtained through procedures identical to those used in Example 4, except that allyl glycidyl ether was not used and the amount of methyldimethoxysilane used was 1.45 parts by weight. For the polyoxypropylene (C-2), the total number of groups per terminal structure was 1.0, the degree of hydrolyzable silyl group introduction was 77%, the number of the hydrolyzable silyl groups per terminal structure was 0.77, and the number-average molecular weight was 16,000.

Example 6

Propylene oxide was polymerized using polyoxypropylene diol having a number-average molecular weight of about 3,000 as an initiator in the presence of a zinc hexacyanocobaltate-glyme complex catalyst. As a result, hydroxy-terminated polyoxypropylene (E-3) having a number-average molecular weight of 28,000 was obtained. Subsequently, 1.0 equivalent of sodium methoxide dissolved in methanol was added per equivalent of the hydroxy groups of the hydroxy-terminated polyoxypropylene, and methanol was distilled off at 140° C. This was followed by addition of 1.0 equivalent of allyl glycidyl ether, and the reaction was allowed to proceed at 140° C. for 2 hours to introduce unsaturated bonds. Further, 1.5 equivalents of 3-chloro-1-propene was added to convert the terminal hydroxy groups to allyl groups. To 100 parts by weight of the resulting allyl-terminated polyoxypropylene were added 36 ppm of a platinum-divinyldisiloxane complex (isopropyl alcohol solution with a concentration of 3 mass % calculated as the platinum content) and 1.26 parts by weight of methyldimethoxysilane, and the reaction was allowed to proceed at 90° C. for 2 hours to give terminal methyldimethoxysilyl group-containing linear polyoxypropylene (A-6) in which the total number of groups per terminal structure was 2.0, the degree of hydrolyzable silyl group introduction was 58%, and the number of the hydrolyzable silyl groups per terminal structure was 1.16 and whose number-average molecular weight was 28,000.

Comparative Example 3

Terminal methyldimethoxysilyl group-containing linear polyoxypropylene (C-3) was obtained through procedures identical to those used in Example 6, except that allyl glycidyl ether was not used and the amount of methyldimethoxysilane used was 0.94 parts by weight. For the polyoxypropylene (C-3), the total number of groups per terminal structure was 1.0, the degree of hydrolyzable silyl group introduction was 78%, the number of the hydrolyzable silyl groups per terminal structure was 0.78, and the number-average molecular weight was 28,000.

Comparative Example 4

Terminal methyldimethoxysilyl group-containing linear polyoxypropylene (C-4) was obtained through procedures identical to those used in Example 6, except that the amount of methyldimethoxysilane used was 1.85 parts by weight. For the polyoxypropylene (C-4), the total number of groups per terminal structure was 2.0, the degree of hydrolyzable silyl group introduction was 80%, the number of the hydrolyzable silyl groups per terminal structure was 1.60, and the number-average molecular weight was 28,000.

Example 7

Propylene oxide was polymerized using polyoxypropylene triol having a number-average molecular weight of about 3,000 as an initiator in the presence of a zinc hexacyanocobaltate-glyme complex catalyst. As a result, hydroxy-terminated polyoxypropylene (E-4) having a number-average molecular weight of 20,000 was obtained. Subsequently, 1.0 equivalent of sodium methoxide dissolved in methanol was added per equivalent of the hydroxy groups of the hydroxy-terminated polyoxypropylene, and methanol was distilled off at 140° C. This was followed by addition of 1.6 equivalents of allyl glycidyl ether, and the reaction was allowed to proceed at 140° C. for 2 hours to introduce unsaturated bonds. Further, 1.5 equivalents of 3-chloro-1-propene was added to convert the terminal hydroxy groups to allyl groups. To 100 parts by weight of the resulting allyl-terminated polyoxypropylene were added 36 ppm of a platinum-divinyldisiloxane complex (isopropyl alcohol solution with a concentration of 3 mass % calculated as the platinum content) and 1.69 parts by weight of methyldimethoxysilane, and the reaction was allowed to proceed at 90° C. for 2 hours to give terminal methyldimethoxysilyl group-containing branched polyoxypropylene (A-7) in which the total number of groups per terminal structure was 2.6, the degree of hydrolyzable silyl group introduction was 38%, and the number of the hydrolyzable silyl groups per terminal structure was 0.99 and whose number-average molecular weight was 20,000.

Comparative Example 5

Terminal methyldimethoxysilyl group-containing branched polyoxypropylene (C-5) was obtained through procedures identical to those used in Example 7, except that allyl glycidyl ether was not used and the amount of methyldimethoxysilane used was 1.22 parts by weight. For the polyoxypropylene (C-5), the total number of groups per terminal structure was 1.0, the degree of hydrolyzable silyl group introduction was 61%, the number of the hydrolyzable silyl groups per terminal structure was 0.61, and the number-average molecular weight was 20,000.

Example 8

Propylene oxide was polymerized using polyoxypropylene diol having a number-average molecular weight of about 3,000 as an initiator in the presence of a zinc hexacyanocobaltate-glyme complex catalyst. As a result, hydroxy-terminated polyoxypropylene (E-5) having a number-average molecular weight of 21,000 was obtained. Subsequently, 1.0 equivalent of sodium methoxide dissolved in methanol was added per equivalent of the hydroxy groups of the hydroxy-terminated polyoxypropylene, and methanol was distilled off at 140° C. This was followed by addition of 2.2 equivalents of allyl glycidyl ether, and the reaction was allowed to proceed at 140° C. for 2 hours to introduce unsaturated bonds. Further, 1.5 equivalents of 3-chloro-1-propene was added to convert the terminal hydroxy groups to allyl groups. To 100 parts by weight of the resulting allyl-terminated polyoxypropylene were added 36 ppm of a platinum-divinyldisiloxane complex (isopropyl alcohol solution with a concentration of 3 mass % calculated as the platinum content) and 1.89 parts by weight of methyldimethoxysilane, and the reaction was allowed to proceed at 90° C. for 2 hours to give terminal methyldimethoxysilyl group-containing linear polyoxypropylene (A-8) in which the total number of groups per terminal structure was 3.2, the degree of hydrolyzable silyl group introduction was 47%, and the number of the hydrolyzable silyl groups per terminal structure was 1.50 and whose number-average molecular weight was 21,000.

Comparative Example 6

Terminal methyldimethoxysilyl group-containing linear polyoxypropylene (C-6) was obtained through procedures identical to those used in Example 8, except that allyl glycidyl ether was not used and the amount of methyldimethoxysilane used was 1.17 parts by weight. For the polyoxypropylene (C-6), the total number of groups per terminal structure was 1.0, the degree of hydrolyzable silyl group introduction was 77%, the number of the hydrolyzable silyl groups per terminal structure was 0.77, and the number-average molecular weight was 21,000.

Example 9

Terminal methyldimethoxysilyl group-containing linear polyoxypropylene (A-9) was obtained through procedures identical to those in Example 1, except that the amount of allyl glycidyl ether used was 2.0 equivalents and the amount of methyldimethoxysilane used was 1.69 parts by weight. For the polyoxypropylene (A-9), the total number of groups per terminal structure was 3.0, the degree of hydrolyzable silyl group introduction was 41%, the number of the hydrolyzable silyl groups per terminal structure was 1.23, and the number-average molecular weight was 19,000.

Example 10

Terminal methyldimethoxysilyl group-containing linear polyoxypropylene (A-10) was obtained through procedures identical to those in Example 1, except that the amount of allyl glycidyl ether used was 2.0 equivalents and the amount of methyldimethoxysilane used was 1.73 parts by weight. For the polyoxypropylene (A-10), the total number of groups per terminal structure was 3.0, the degree of hydrolyzable silyl group introduction was 43%, the number of the hydrolyzable silyl groups per terminal structure was 1.29, and the number-average molecular weight was 19,000.

Example 11

Terminal methyldimethoxysilyl group-containing linear polyoxypropylene (A-11) was obtained through procedures identical to those in Example 1, except that the amount of allyl glycidyl ether used was 2.0 equivalents and the amount of methyldimethoxysilane used was 2.00 parts by weight. For the polyoxypropylene (A-11), the total number of groups per terminal structure was 3.0, the degree of hydrolyzable silyl group introduction was 47%, the number of the hydrolyzable silyl groups per terminal structure was 1.41, and the number-average molecular weight was 19,000.

Example 12

Terminal methyldimethoxysilyl group-containing linear polyoxypropylene (A-12) was obtained through procedures identical to those in Example 1, except that the amount of allyl glycidyl ether used was 2.0 equivalents and the amount of methyldimethoxysilane used was 2.10 parts by weight. For the polyoxypropylene (A-12), the total number of groups per terminal structure was 3.0, the degree of hydrolyzable silyl group introduction was 49%, the number of the hydrolyzable silyl groups per terminal structure was 1.47, and the number-average molecular weight was 19,000.

Example 13

Terminal methyldimethoxysilyl group-containing linear polyoxypropylene (A-13) was obtained through procedures identical to those in Example 1, except that the amount of allyl glycidyl ether used was 2.0 equivalents and the amount of methyldimethoxysilane used was 2.56 parts by weight. For the polyoxypropylene (A-13), the total number of groups per terminal structure was 3.0, the degree of hydrolyzable silyl group introduction was 60%, the number of the hydrolyzable silyl groups per terminal structure was 1.80, and the number-average molecular weight was 19,000.

Comparative Example 7

Terminal methyldimethoxysilyl group-containing linear polyoxypropylene (C-7) was obtained through procedures identical to those used in Example 1, except that the amount of allyl glycidyl ether used was 2.0 equivalents and the amount of methyldimethoxysilane used was 3.15 parts by weight. For the polyoxypropylene (C-7), the total number of groups per terminal structure was 3.0, the degree of hydrolyzable silyl group introduction was 75%, the number of the hydrolyzable silyl groups per terminal structure was 2.25, and the number-average molecular weight was 19,000.

Synthesis Example 1

A four-necked flask equipped with a stirrer was charged with 54.5 parts by weight of isobutyl alcohol, which was heated to 105° C. under nitrogen atmosphere. To the heated isobutyl alcohol was added dropwise over 5 hours a liquid mixture prepared by dissolving 10.0 parts by weight of methyl methacrylate, 71.5 parts by weight of butyl acrylate, 15.0 parts by weight of stearyl methacrylate, 3.5 parts by weight of 3-(dimethoxymethylsilyl)propyl methacrylate, and 0.5 parts by weight of 2,2'-azobis(2-methylbutyronitrile) in 10.0 parts by weight of isobutyl alcohol. Polymerization was allowed to proceed at 105° C. for 2 hours to give an isobutyl alcohol solution (solid content=60 wt %) of poly(meth)acrylic ester (B-1) having 1.6 methyldimethoxysilyl groups on average per molecule, a number-average molecular weight of 10,500, and a weight-average molecular weight of 25,000.

Synthesis Example 2

A four-necked flask equipped with a stirrer was charged with 52.1 parts by weight of isobutyl alcohol, which was heated to 90° C. under nitrogen atmosphere. To the heated isobutyl alcohol was added dropwise over 7 hours a liquid mixture prepared by dissolving 14.5 parts by weight of methyl methacrylate, 68.2 parts by weight of butyl acrylate, 14.9 parts by weight of stearyl methacrylate, 2.4 parts by weight of 3-(dimethoxymethylsilyl)propyl methacrylate, and 0.3 parts by weight of 2,2'-azobis(2-methylbutyronitrile) in 12.4 parts by weight of isobutyl alcohol. Polymerization was allowed to proceed at 90° C. for 2 hours to give an isobutyl alcohol solution (solid content=60 wt %) of poly(meth)acrylic ester (B-2) having 1.8 methyldimethoxysilyl groups on average per molecule, a number-average molecular weight of 17,000, and a weight-average molecular weight of 48,000.

Synthesis Example 3

A four-necked flask equipped with a stirrer was charged with 54.5 parts by weight of isobutyl alcohol, which was heated to 105° C. under nitrogen atmosphere. To the heated isobutyl alcohol was added dropwise over 5 hours a liquid mixture prepared by dissolving 10.0 parts by weight of methyl methacrylate, 71.2 parts by weight of butyl acrylate, 15.0 parts by weight of stearyl methacrylate, 3.8 parts by weight of 3-(trimethoxysilyl)propyl methacrylate, and 0.5 parts by weight of 2,2'-azobis(2-methylbutyronitrile) in 10.0 parts by weight of isobutyl alcohol. Polymerization was allowed to proceed at 105° C. for 2 hours to give an isobutyl alcohol solution (solid content=60 wt %) of poly(meth)acrylic ester (B-3) having 1.5 trimethoxysilyl groups on average per molecule, a number-average molecular weight of 9,800, and a weight-average molecular weight of 23,000.

Synthesis Example 4

A four-necked flask equipped with a stirrer was charged with 54.5 parts by weight of isobutyl alcohol, which was heated to 105° C. under nitrogen atmosphere. To the heated isobutyl alcohol was added dropwise over 5 hours a liquid mixture prepared by dissolving 10.0 parts by weight of methyl methacrylate, 71.7 parts by weight of butyl acrylate, 15.0 parts by weight of stearyl methacrylate, 3.3 parts by weight of 3-(trimethoxysilyl)propyl methacrylate, and 0.5 parts by weight of 2,2'-azobis(2-methylbutyronitrile) in 10.0 parts by weight of isobutyl alcohol. Polymerization was allowed to proceed at 105° C. for 2 hours to give an isobutyl alcohol solution (solid content=60 wt %) of poly(meth)acrylic ester (B-4) having 1.3 trimethoxysilyl groups on average per molecule, a number-average molecular weight of 9,800, and a weight-average molecular weight of 23,000.

Example 14

70 parts by weight of the polymer (A-10) obtained in Example 10 and 50 parts by weight of the isobutyl-alcoholic polymer (B-1) solution obtained in Synthesis Example 1 were mixed, and isobutyl alcohol was distilled off under reduced pressure to obtain a polymer mixture having a polymer (A-10)/polymer (B-1) weight ratio of 70/30. The obtained polymer mixture was used in Example 36.

Example 15

70 parts by weight of the polymer (A-2) obtained in Example 2 and 50 parts by weight of the isobutyl-alcoholic polymer (B-1) solution obtained in Synthesis Example 1 were mixed, and isobutyl alcohol was distilled off under reduced pressure to obtain a polymer mixture having a polymer (A-2)/polymer (B-1) weight ratio of 70/30. The obtained polymer mixture was used in Example 37.

Example 16

70 parts by weight of the polymer (A-10) obtained in Example 10 and 50 parts by weight of the isobutyl-alcoholic polymer (B-3) solution obtained in Synthesis Example 3 were mixed, and isobutyl alcohol was distilled off under reduced pressure to obtain a polymer mixture having a polymer (A-10)/polymer (B-3) weight ratio of 70/30. The obtained polymer mixture was used in Example 38.

Example 17

70 parts by weight of the polymer (A-2) obtained in Example 2 and 50 parts by weight of the isobutyl-alcoholic polymer (B-3) solution obtained in Synthesis Example 3 were mixed, and isobutyl alcohol was distilled off under reduced pressure to obtain a polymer mixture having a polymer (A-2)/polymer (B-3) weight ratio of 70/30. The obtained polymer mixture was used in Example 39.

Example 18

70 parts by weight of the polymer (A-10) obtained in Example 10 and 50 parts by weight of the isobutyl-alcoholic polymer (B-4) solution obtained in Synthesis Example 4 were mixed, and isobutyl alcohol was distilled off under reduced pressure to obtain a polymer mixture having a polymer (A-10)/polymer (B-4) weight ratio of 70/30. The obtained polymer mixture was used in Example 40.

Example 19

70 parts by weight of the polymer (A-2) obtained in Example 2 and 50 parts by weight of the isobutyl-alcoholic polymer (B-4) solution obtained in Synthesis Example 4 were mixed, and isobutyl alcohol was distilled off under reduced pressure to obtain a polymer mixture having a polymer (A-2)/polymer (B-4) weight ratio of 70/30. The obtained polymer mixture was used in Example 41.

Comparative Example 8

70 parts by weight of the polymer (C-1) obtained in Comparative Example 1 and 50 parts by weight of the isobutyl-alcoholic polymer (B-1) solution obtained in Synthesis Example 1 were mixed, and isobutyl alcohol was distilled off under reduced pressure to obtain a polymer mixture having a polymer (C-1)/polymer (B-1) weight ratio of 70/30. The obtained polymer mixture was used in Comparative Example 17.

Example 20

70 parts by weight of the polymer (A-8) obtained in Example 8 and 50 parts by weight of the isobutyl-alcoholic polymer (B-1) solution obtained in Synthesis Example 1 were mixed, and isobutyl alcohol was distilled off under reduced pressure to obtain a polymer mixture having a polymer (A-8)/polymer (B-1) weight ratio of 70/30. The obtained polymer mixture was used in Example 42.

Example 21

70 parts by weight of the polymer (A-7) obtained in Example 7 and 50 parts by weight of the isobutyl-alcoholic polymer (B-1) solution obtained in Synthesis Example 1 were mixed, and isobutyl alcohol was distilled off under reduced pressure to obtain a polymer mixture having a polymer (A-7)/polymer (B-1) weight ratio of 70/30. The obtained polymer mixture was used in Example 43.

Example 22

70 parts by weight of the polymer (A-6) obtained in Example 6 and 50 parts by weight of the isobutyl-alcoholic polymer (B-2) solution obtained in Synthesis Example 2 were mixed, and isobutyl alcohol was distilled off under reduced pressure to obtain a polymer mixture having a polymer (A-6)/polymer (B-2) weight ratio of 70/30. The obtained polymer mixture was used in Example 44.

Comparative Example 9

70 parts by weight of the polymer (C-3) obtained in Comparative Example 3 and 50 parts by weight of the isobutyl-alcoholic polymer (B-2) solution obtained in Synthesis Example 2 were mixed, and isobutyl alcohol was distilled off under reduced pressure to obtain a polymer mixture having a polymer (C-3)/polymer (B-2) weight ratio of 70/30. The obtained polymer mixture was used in Comparative Example 18.

Synthesis Example 5

Propylene oxide was polymerized using n-butanol as an initiator in the presence of a zinc hexacyanocobaltate-glyme complex catalyst. As a result, polyoxypropylene having a number-average molecular weight of 8,000 and terminated at one end by a hydroxy group was obtained. Subsequently, 1.0 equivalent of sodium methoxide dissolved in methanol was added per equivalent of the hydroxy groups of the one-end-hydroxy-terminated polyoxypropylene, then methanol was distilled off at 140° C., and 1.5 equivalents of 3-chloro-1-propene was added to convert the terminal hydroxy groups to allyl groups. To 100 parts by weight of the resulting polyoxypropylene terminated at one end by an allyl group were added 36 ppm of a platinum-divinyldisiloxane complex (isopropyl alcohol solution with a concentration of 3 mass % calculated as the platinum content) and 1.80 parts by weight of methyldimethoxysilane, and the reaction was allowed to proceed at 90° C. for 2 hours to give a reactive diluent (D-1) in the form of a linear polyoxypropylene polymer having a number-average molecular weight of 8,000 and terminated at one end by a methyldimethoxysilyl group serving as a hydrolyzable silyl group, with the number of the methyldimethoxysilyl groups being 0.8 on average per molecule. The reactive diluent (D-1) was a polymer having a lower viscosity at 23° C. than the polymers or polymer mixtures obtained in Examples 1 to 22 and Comparative Examples 1 to 9.

Examples 23 to 44 and Comparative Examples 10 to 18

The following evaluation procedures were performed using the polymers or polymer mixtures obtained in Examples 1 to 22 and Comparative Examples 1 to 9.
Methods of Measuring Stress at 100% Elongation and Recovery Rate of Cured Product of Polymer The stress at 100% elongation and recovery rate of a cured product of each polymer were measured by the methods previously described. For the polymer mixtures obtained in Examples 14 to 22 and Comparative Examples 8 and 9, the stress at 100% elongation was measured using each polymer mixture under the same conditions as for the polymers.
Method of Evaluating Composition Physical Properties Each polymer or polymer mixture was thoroughly mixed with some of the additives listed below, in particular the filler, titanium oxide, anti-sagging agent, light stabilizer, and ultraviolet absorber. The mixture was passed through a three-roll paint mill three times to disperse the components to prepare a base material. Subsequently, a dehydration agent, tackifier, and silanol condensation catalyst were added to and thoroughly mixed with the base material, and the mixture was kneaded and defoamed uniformly using a planetary mixer. In this manner, curable compositions were produced from the polymers and polymer mixtures. Each of the curable compositions produced was used to prepare specimens in a constant-temperature and humidity environment with a temperature of 23° C. and a relative humidity of 50%, and the specimens were subjected to the evaluation procedures.
Additives Used in Examples and Comparative Examples for Evaluation of Composition Physical Properties The additives listed below were used for evaluation of the composition physical properties in Examples 23 to 44 and Comparative Examples 10 to 18. The amount of each additive added is shown as parts by weight per 100 parts by weight of the polymer or polymer mixture used as a base polymer.

Reactive diluent (D): Reactive diluent (D-1), 76 parts by weight

Filler: (i) Fatty acid-treated precipitated calcium carbonate (HAKUENKA CCR, manufactured by Shiraishi Kogyo Kaisha, Ltd.), 120 parts by weight (ii) Heavy calcium carbonate (WHITON SB RED, manufactured by Shiraishi Calcium Kaisha, Ltd.), 40 parts by weight Titanium oxide: TIPAQUE R-820 (manufactured by Ishihara Sangyo Kaisha, Ltd.), 10 parts by weight Anti-sagging agent: Fatty acid amide wax (DISPARLON #6500, manufactured by Kusumoto Chemicals, Ltd.), 2 parts by weight Light stabilizer: Bis(2,2,6,6-tetramethyl-4-piperidyl) sebacate (Tinuvin 770, manufactured by BASF), 1 part by weight Ultraviolet absorber: 2-(5-Chloro-2H-benzotriazole-2-yl)-4-methyl-6-tert-butylphenol (Tinuvin 326, manufactured by BASF), 1 part by weight Dehydration agent: Vinyltrimethoxysilane (A-171, manufactured by Momentive Performance Materials Inc.), 2 parts by weight Tackifier: 3-(N-2-aminoethylamino)propyltrimethoxysilane (A-112, manufactured by Momentive Performance Materials Inc.), 3 parts by weight Silanol condensation catalyst: Dioctyltin dilaurate (U-810, manufactured by Nitto Kasei Co., Ltd.), 2 parts by weight Physical Properties of Dumbbell-Shaped Specimen A 3-mm-thick sheet-shaped mold was charged with the curable composition at a temperature of 23° C. and a relative humidity of 50%. The composition was cured at a temperature of 23° C. and a relative humidity of 50% for 3 days, after which the cured composition was aged in a dryer at 50° C. for 4 days to obtain a sheet-shaped cured product. The cured product obtained was punched to prepare a No. 3 dumbbell-shaped specimen according to JIS K 6251. The specimen prepared was subjected to tensile testing (tensile speed=200 mm/min), which was performed using Autograph at a temperature of 23° C. and a relative humidity of 50% to measure the stress at 50% elongation, stress at 100% elongation, stress at break, and elongation at break.

Recovery Performance

The sheet-shaped cured product obtained as above was punched to prepare a No. 7 dumbbell-shaped specimen. Two lines were drawn in the dumbbell-shaped specimen, with the waist portion of the dumbbell-shaped specimen being at the middle between the lines and with a line-to-line distance of 20 mm. The dumbbell-shaped specimen was elongated so that the distance between the lines reached 40 mm, and the specimen fixed in this elongated state was allowed to stand in a dryer at 50° C. After 24 hours, the specimen was released from the elongated state and left at a temperature of 23° C. and a relative humidity of 50% for 24 hours, after which the distance between the lines was measured to determine the recovery rate.

The results obtained by the above procedures are shown in Tables 1 to 8. Table 1 lists the results obtained for the polymers (A-1), (A-2), (A-3), and (C-1) which were synthesized using the hydroxy-terminated polyoxypropylene (E-1) as a starting material. Table 2 lists the results obtained for the polymers synthesized using the hydroxy-terminated polyoxypropylene (E-2) as a starting material, Table 3 lists the results obtained for the polymers synthesized using the hydroxy-terminated polyoxypropylene (E-3) as a starting material, Table 4 lists the results obtained for the polymers synthesized using the hydroxy-terminated polyoxypropylene (E-4) as a starting material, and Table 5 lists the results obtained for the polymers synthesized using the hydroxy-terminated polyoxypropylene (E-5) as a starting material. Table 6 lists the results obtained for the polymers which were synthesized using the hydroxy-terminated polyoxypropylene (E-1) as a starting material and in which the total number of groups per terminal structure was 3.0.

Table 7 lists the results for the cases of the combined use of the (meth)acrylic ester polymer (B) and either the polyoxyalkylene polymer (A) which was synthesized using the hydroxy-terminated polyoxypropylene (E-1) as a starting material or the polyoxyalkylene polymer (C) which was also synthesized using the hydroxy-terminated polyoxypropylene (E-1) as a starting material but did not meet the requirements according to one or more embodiments of the present invention. Table 8 lists the results for the cases of the combined use of the (meth)acrylic ester polymer (B) and either the polyoxyalkylene polymer (A) which was synthesized using a polymer other than the hydroxy-terminated polyoxypropylene (E-1) as a starting material or the polyoxyalkylene polymer (C) which was also synthesized using a polymer other than the hydroxy-terminated polyoxypropylene (E-1) as a starting material but did not meet the requirements according to one or more embodiments of the present invention.

TABLE 1

| Proportions (parts by weight) | Example 23 | Example 24 | Example 25 | Comp. Example 10 |
|---|---|---|---|---|
| Polymer used | A-1 | A-2 | A-3 | C-1 |
| Physical properties of polyoxyalkylene polymer alone | | | | |
| Total number of groups per terminal structure | 1.3 | 3.0 | 4.0 | 1.0 |
| Degree of hydrolyzable silyl group introduction | 68% | 46% | 42% | 74% |
| Number of hydrolyzable silyl groups per terminal structure | 0.88 | 1.38 | 1.68 | 0.74 |
| Stress at 100% elongation (MPa) | 0.27 | 0.24 | 0.26 | 0.26 |
| Recovery rate measured at 1 hour after release from 5-hour elongation at 50° C. | 95% | 95% | 99% | 88% |

TABLE 1-continued

| Proportions (parts by weight) | | Example 23 | Example 24 | Example 25 | Comp. Example 10 |
|---|---|---|---|---|---|
| Component proportions of composition | | | | | |
| Base polymer | Polyoxyalkylene polymer | 100 | 100 | 100 | 100 |
| Physical properties of composition | | | | | |
| Physical properties of dumbbell-shaped specimen (No. 3 dumbbell) | Stress at 50% elongation (MPa) | 0.21 | 0.17 | 0.25 | 0.23 |
| | Stress at 100% elongation (MPa) | 0.35 | 0.30 | 0.43 | 0.40 |
| | Stress at break (MPa) | 1.99 | 1.59 | 2.05 | 1.77 |
| | Elongation at break (%) | 909% | 817% | 805% | 789% |
| Recovery performance | Recovery rate measured at 24 hours after release from 24-hour elongation at 50° C. | 38% | 47% | 56% | 32% |

TABLE 2

| Proportions (parts by weight) | | Example 26 | Example 27 | Comp. Example 11 |
|---|---|---|---|---|
| Polymer used | | A-4 | A-5 | C-2 |
| Physical properties of polyoxyalkylene polymer alone | | | | |
| Total number of groups per terminal structure | | 3.0 | 3.0 | 1.0 |
| Degree of hydrolyzable silyl group introduction | | 42% | 48% | 77% |
| Number of hydrolyzable silyl groups per terminal structure | | 1.26 | 1.44 | 0.77 |
| Stress at 100% elongation (MPa) | | 0.20 | 0.27 | 0.26 |
| Recovery rate measured at 1 hour after release from 5-hour elongation at 50° C. | | 94% | 96% | 87% |
| Component proportions of composition | | | | |
| Base polymer | Polyoxyalkylene polymer | 100 | 100 | 100 |
| Physical properties of composition | | | | |
| Physical properties of dumbbell-shaped specimen (No. 3 dumbbell) | Stress at 50% elongation (MPa) | 0.19 | 0.27 | 0.25 |
| | Stress at 100% elongation (MPa) | 0.33 | 0.48 | 0.43 |
| | Stress at break (MPa) | 1.58 | 1.83 | 1.64 |
| | Elongation at break (%) | 661% | 610% | 696% |
| Recovery performance | Recovery rate measured at 24 hours after release from 24-hour elongation at 50° C. | 45% | 52% | 34% |

TABLE 3

| Proportions (parts by weight) | | Example 28 | Comp. Example 12 | Comp. Example 13 |
|---|---|---|---|---|
| Polymer used | | A-6 | C-3 | C-4 |
| Physical properties of polyoxyalkylene polymer alone | | | | |
| Total number of groups per terminal structure | | 2.0 | 1.0 | 2.0 |
| Degree of hydrolyzable silyl group introduction | | 58% | 78% | 80% |
| Number of hydrolyzable silyl groups per terminal structure | | 1.16 | 0.78 | 1.60 |
| Stress at 100% elongation (MPa) | | 0.23 | 0.24 | 0.48 |
| Recovery rate measured at 1 hour after release from 5-hour elongation at 50° C. | | 94% | 88% | 95% |
| Component proportions of composition | | | | |
| Base polymer | Polyoxyalkylene polymer | 100 | 100 | 100 |
| Physical properties of composition | | | | |
| Physical properties of dumbbell-shaped specimen (No. 3 dumbbell) | Stress at 50% elongation (MPa) | 0.14 | 0.20 | 0.45 |
| | Stress at 100% elongation (MPa) | 0.23 | 0.33 | 0.73 |
| | Stress at break (MPa) | 1.64 | 1.93 | 2.72 |
| | Elongation at break (%) | 1055% | 1014% | 738% |
| Recovery performance | Recovery rate measured at 24 hours after release from 24-hour elongation at 50° C. | 37% | 29% | 62% |

TABLE 4

| Proportions (parts by weight) | | Example 29 | Comp. Example 14 |
|---|---|---|---|
| Polymer used | | A-7 | C-5 |
| Physical properties of polyoxyalkylene polymer alone | | | |
| Total number of groups per terminal structure | | 2.6 | 1.0 |
| Degree of hydrolyzable silyl group introduction | | 38% | 61% |
| Number of hydrolyzable silyl groups per terminal structure | | 0.99 | 0.61 |
| Stress at 100% elongation (MPa) | | 0.26 | 0.26 |
| Recovery rate measured at 1 hour after release from 5-hour elongation at 50° C. | | 96% | 94% |
| Component proportions of composition | | | |
| Base polymer | Polyoxyalkylene polymer | 100 | 100 |
| Physical properties of composition | | | |
| Physical properties of dumbbell-shaped specimen (No. 3 dumbbell) | Stress at 50% elongation (MPa) | 0.22 | 0.23 |
| | Stress at 100% elongation (MPa) | 0.40 | 0.41 |
| | Stress at break (MPa) | 1.62 | 1.70 |
| | Elongation at break (%) | 656% | 680% |
| Recovery performance | Recovery rate measured at 24 hours after release from 24-hour elongation at 50° C. | 55% | 34% |

TABLE 5

| Proportions (parts by weight) | | Example 30 | Comp. Example 15 |
|---|---|---|---|
| Polymer used | | A-8 | C-6 |
| Physical properties of polyoxyalkylene polymer alone | | | |
| Total number of groups per terminal structure | | 3.2 | 1.0 |
| Degree of hydrolyzable silyl group introduction | | 47% | 77% |
| Number of hydrolyzable silyl groups per terminal structure | | 1.50 | 0.77 |
| Stress at 100% elongation (MPa) | | 0.23 | 0.23 |
| Recovery rate measured at 1 hour after release from 5-hour elongation at 50° C. | | 99% | 84% |
| Component proportions of composition | | | |
| Base polymer | Polyoxyalkylene polymer | 100 | 100 |
| Physical properties of composition | | | |
| Physical properties of dumbbell-shaped specimen (No. 3 dumbbell) | Stress at 50% elongation (MPa) | 0.18 | 0.19 |
| | Stress at 100% elongation (MPa) | 0.32 | 0.32 |
| | Stress at break (MPa) | 1.73 | 1.64 |
| | Elongation at break (%) | 778% | 890% |
| Recovery performance | Recovery rate measured at 24 hours after release from 24-hour elongation at 50° C. | 52% | 23% |

TABLE 6

| Proportions (parts by weight) | Example 31 | Example 32 | Example 33 | Example 34 | Example 35 | Comp. Example 10 | Comp. Example 16 |
|---|---|---|---|---|---|---|---|
| Polymer used | A-9 | A-10 | A-11 | A-12 | A-13 | C-1 | C-7 |
| Physical properties of polyoxyalkylene polymer alone | | | | | | | |
| Total number of groups per terminal structure | 3.0 | 3.0 | 3.0 | 3.0 | 3.0 | 1.0 | 3.0 |
| Degree of hydrolyzable silyl group introduction | 41% | 43% | 47% | 49% | 60% | 74% | 75% |
| Number of hydrolyzable silyl groups per terminal structure | 1.23 | 1.29 | 1.41 | 1.47 | 1.80 | 0.74 | 2.25 |
| Stress at 100% elongation (MPa) | 0.18 | 0.19 | 0.28 | 0.32 | 0.40 | 0.26 | 0.40(*) |
| Recovery rate measured at 1 hour after release from 5-hour elongation at 50° C. | 96% | 99% | 99% | 99% | 99% | 88% | 96% |

TABLE 6-continued

| Proportions (parts by weight) | | Example 31 | Example 32 | Example 33 | Example 34 | Example 35 | Comp. Example 10 | Comp. Example 16 |
|---|---|---|---|---|---|---|---|---|
| Component proportions of composition | | | | | | | | |
| Base polymer | Polyoxyalkylene polymer | 100 | 100 | 100 | 100 | 100 | 100 | 100 |
| Physical properties of composition | | | | | | | | |
| Physical properties of dumbbell-shaped specimen (No. 3 dumbbell) | Stress at 50% elongation (MPa) | 0.15 | 0.13 | 0.20 | 0.23 | 0.32 | 0.23 | 0.52 |
| | Stress at 100% elongation (MPa) | 0.28 | 0.25 | 0.36 | 0.41 | 0.56 | 0.40 | 0.88 |
| | Stress at break (MPa) | 1.39 | 1.45 | 2.02 | 2.19 | 2.30 | 1.77 | 2.09 |
| | Elongation at break (%) | 765% | 825% | 865% | 812% | 693% | 789% | 444% |
| Recovery performance | Recovery rate measured at 24 hours after release from 24-hour elongation at 50° C. | 41% | 44% | 45% | 49% | 65% | 32% | 74% |

(*)The modulus at 50% elongation is shown because the specimen was not elongated to 100%.

TABLE 7

| Proportions (parts by weight) | Example 36 | Example 37 | Example 38 | Example 39 | Example 40 | Example 41 | Comp. Example 17 |
|---|---|---|---|---|---|---|---|
| Polymer (E) used as main chain structure | | | | (E-1) | | | |
| Polymers used | A-10 B-1 | A-2 B-1 | A-10 B-3 | A-2 B-3 | A-10 B-4 | A-2 B-4 | C-1 B-1 |
| Physical properties of polyoxyalkylene polymer alone | | | | | | | |
| Total number of groups per terminal structure | 3.0 | 3.0 | 3.0 | 3.0 | 3.0 | 3.0 | 1.0 |
| Degree of hydrolyzable silyl group introduction | 43% | 46% | 43% | 46% | 43% | 46% | 74% |
| Number of hydrolyzable silyl groups per terminal structure | 1.29 | 1.38 | 1.29 | 1.38 | 1.29 | 1.38 | 0.74 |
| Physical properties of polyoxyalkylene polymer/(meth)acrylic polymer mixture alone | | | | | | | |
| Stress at 100% elongation (MPa) | 0.17 | 0.21 | 0.21 | 0.23 | 0.18 | 0.21 | 0.20 |
| Component proportions of composition | | | | | | | |
| Base polymer — Polyoxyalkylene polymer | 70 | 70 | 70 | 70 | 70 | 70 | 70 |
| Base polymer — (Meth)acrylic ester polymer | 30 | 30 | 30 | 30 | 30 | 30 | 30 |
| Physical properties of composition | | | | | | | |
| Physical properties of dumbbell-shaped specimen (No. 3 dumbbell) — Stress at 50% elongation (MPa) | 0.20 | 0.21 | 0.26 | 0.28 | 0.23 | 0.27 | 0.25 |
| Stress at 100% elongation (MPa) | 0.38 | 0.42 | 0.47 | 0.51 | 0.42 | 0.50 | 0.46 |
| Stress at break (MPa) | 1.17 | 1.43 | 1.24 | 1.27 | 1.13 | 1.17 | 1.32 |
| Elongation at break (%) | 451% | 476% | 449% | 437% | 465% | 417% | 489% |
| Recovery performance — Recovery rate measured at 24 hours after release from 24-hour elongation at 50° C. | 41% | 44% | 47% | 51% | 49% | 51% | 30% |

TABLE 8

| Proportions (parts by weight) | Example 42 | Example 43 | Example 44 | Comp. Example 18 |
|---|---|---|---|---|
| Polymer (E) used as main chain structure | (E-5) | (E-4) | (E-3) | |
| Polymers used | A-8 B-1 | A-7 B-1 | A-6 B-2 | C-3 B-2 |
| Physical properties of polyoxyalkylene polymer alone | | | | |
| Total number of groups per terminal structure | 3.2 | 2.6 | 2.0 | 1.0 |
| Degree of hydrolyzable silyl group introduction | 47% | 38% | 58% | 78% |
| Number of hydrolyzable silyl groups per terminal structure | 1.50 | 0.99 | 1.16 | 0.78 |
| Physical properties of polyoxyalkylene polymer/(meth)acrylic polymer mixture alone | | | | |
| Stress at 100% elongation (MPa) | 0.20 | 0.21 | 0.18 | 0.18 |
| Component proportions of composition | | | | |
| Base polymer — Polyoxyalkylene polymer | 70 | 70 | 70 | 70 |
| Base polymer — (Meth)acrylic ester polymer | 30 | 30 | 30 | 30 |

TABLE 8-continued

| Proportions (parts by weight) | | Example 42 | Example 43 | Example 44 | Comp. Example 18 |
|---|---|---|---|---|---|
| Physical properties of composition | | | | | |
| Physical properties of dumbbell-shaped specimen (No. 3 dumbbell) | Stress at 50% elongation (MPa) | 0.22 | 0.26 | 0.17 | 0.19 |
| | Stress at 100% elongation (MPa) | 0.42 | 0.51 | 0.33 | 0.34 |
| | Stress at break (MPa) | 1.33 | 1.23 | 1.33 | 1.40 |
| | Elongation at break (%) | 480% | 365% | 593% | 693% |
| Recovery performance | Recovery rate measured at 24 hours after release from 24-hour elongation at 50° C. | 43% | 49% | 39% | 30% |

The results shown in the tables demonstrate that cured products of the compositions of Examples which contained the polyoxyalkylene polymer (A) exhibited the same low level of modulus and higher level of recovery performance than cured products of the compositions of Comparative Examples 10 to 12, 14, 15, 17, and 18 which contained the polyoxyalkylene polymer (C) having substantially the same main chain structure as the polyoxyalkylene polymer (A) but failing to meet the requirements according to one or more embodiments of the present invention due to the total number of groups per terminal structure being 1.0. No significant difference was observed in the physical properties of the dumbbell-shaped specimen between the cured products of the examples and those of the comparative examples.

As for the compositions of Comparative Examples 13 and 16 which contained the polyoxyalkylene polymer (C) in which the total number of groups per terminal structure was more than 1.0 but which did not meet the requirements according to one or more embodiments of the present invention due to the degree of hydrolyzable silyl group introduction being more than 70%, it is seen that cured products of these compositions exhibited excessively high modulus although their recovery performance was high. Such compositions are unsuitable for use as sealing materials.

The above results prove that a cured product of a curable composition containing the polyoxyalkylene polymer (A) according to one or more embodiments of the present invention exhibits low modulus and at the same time high recovery performance and is comparable in other physical properties to existing products, and therefore that the polyoxyalkylene polymer (A) is suitable for use as a base polymer of a sealing material having high recovery performance and less prone to bleed-out.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

The invention claimed is:

1. A polyoxyalkylene polymer (A) comprising a main chain structure of a polyoxyalkylene and terminal structures bonded to ends of the main chain structure, wherein the main chain structure is a polymer main chain composed of oxyalkylene repeating units and the terminal structures are moieties that do not contain the oxyalkylene repeating unit and that are bonded to ends of the main chain structure; the terminal structures are represented by the formula (6):

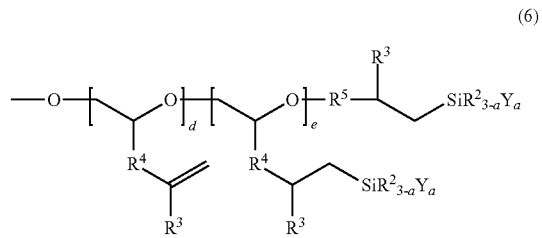

(6)

or the formula (7):

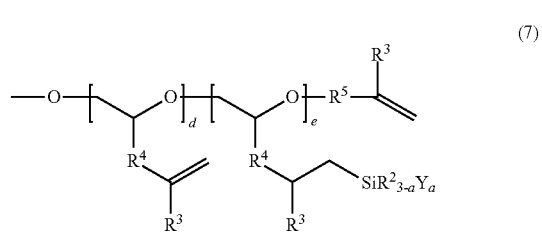

(7)

wherein $R^2$ represents a substituted or unsubstituted monovalent hydrocarbon group having 1 to 20 carbon atoms or a triorganosiloxy group represented by $(R')_3SiO$— and R' represents a substituted or unsubstituted monovalent hydrocarbon group having 1 to 20 carbon atoms;

Y represents a hydroxy group or a hydrolyzable group;

"a" represents 1, 2, or 3;

$R^3$ represents hydrogen, a substituted or unsubstituted alkyl group having 1 to 10 carbon atoms, a substituted or unsubstituted aryl group having 6 to 10 carbon atoms, or a substituted or unsubstituted aralkyl group having 7 to 10 carbon atoms;

$R^4$ represents a direct bond or a divalent organic group having 1 to 6 carbon atoms and optionally an oxygen atom;

$R^5$ represents a direct bond or a divalent organic group having 1 to 6 carbon atoms and optionally an oxygen atom;

"d" and "e" each represent an integer of 0 or more, and the sum of "d" and "e" is more than 0 on average per terminal structure;

at least one of a terminal olefin group present in the formula (6) or (7) is optionally replaced by an internal olefin group;

the order in which "d" terminal olefin group-containing units and "e" hydrolyzable silyl group-containing units are bonded is not limited to those shown in the formula (6) and (7);

the total number of hydrolyzable silyl, terminal olefin, and internal olefin groups is more than 1.0 on average per terminal structure; and the ratio of the number of moles of the hydrolyzable silyl groups to the total number of moles of the hydrolyzable silyl, terminal olefin, and internal olefin groups is from 0.3 to 0.7.

2. The polyoxyalkylene polymer (A) according to claim 1, wherein the terminal structure includes a moiety derived from an epoxy compound having the terminal olefin group.

3. The polyoxyalkylene polymer (A) according to claim 2, wherein the number of the moieties derived from the epoxy compound having the terminal olefin group is more than 1.0 on average per terminal structure.

4. The polyoxyalkylene polymer (A) according to claim 1, wherein the hydrolyzable silyl group is represented by the following formula (3):

—SiR²Y₂    (3), wherein

R² represents a substituted or unsubstituted monovalent hydrocarbon group having 1 to 20 carbon atoms or a triorganosiloxy group represented by (R')₃SiO—, R' represents a substituted or unsubstituted monovalent hydrocarbon group having 1 to 20 carbon atoms, the three R' groups being the same or different, and Y represents a hydroxy group or a hydrolyzable group, the two Y groups being the same or different.

5. The polyoxyalkylene polymer (A) according to claim 1, wherein the number of the hydrolyzable silyl groups is 0.85 or more on average per terminal structure.

6. The polyoxyalkylene polymer (A) according to claim 1, wherein a recovery rate of a cured product of the polyoxyalkylene polymer (A) is 90% or more.

7. The polyoxyalkylene polymer (A) according to claim 1, wherein a stress at 100% elongation of a cured product of the polyoxyalkylene polymer (A) is 0.40 MPa or less.

8. A curable composition comprising the polyoxyalkylene polymer (A) according to claim 1.

9. The curable composition according to claim 8, further comprising a reactive diluent (D), wherein the reactive diluent (D) is a polymer having 0.5 to less than 1.2 hydrolyzable silyl groups on average per molecule and having a lower viscosity at 23° C. than the polyoxyalkylene polymer (A).

10. The curable composition according to claim 8, further comprising a (meth)acrylic ester polymer (B) having a hydrolyzable silyl group.

11. A cured product of the curable composition according to claim 8.

12. The polyoxyalkylene polymer (A) according to claim 1, wherein the total number of the hydrolyzable silyl, terminal olefin, and internal olefin groups is less than 10 on average per terminal structure.

13. The polyoxyalkylene polymer (A) according to claim 5, wherein the number of the hydrolyzable silyl groups is 10 or less on average per terminal structure.

14. The polyoxyalkylene polymer (A) according to claim 1, wherein the terminal olefin group is a carbon-carbon double bond containing a methylidene group, and the internal olefin group is a carbon-carbon double bond containing no methylidene group.

15. The polyoxyalkylene polymer (A) according to claim 14, wherein the terminal olefin group is represented by the following formula (4), and the internal olefin group is represented by the following formula (5):

H₂C=C(R³)—CH₂—    (4)

H₃C—C(R³)=CH—    (5)

in which R³ represents hydrogen, a substituted or unsubstituted alkyl group having 1 to 10 carbon atoms, a substituted or unsubstituted aryl group having 6 to 10 carbon atoms, or a substituted or unsubstituted aralkyl group having 7 to 10 carbon atoms.

16. The polyoxyalkylene polymer (A) according to claim 1, wherein the terminal structures comprise the formula (6) and the formula (7).

* * * * *